United States Patent
Ferrini et al.

(10) Patent No.: US 8,350,233 B2
(45) Date of Patent: Jan. 8, 2013

(54) OPTICAL ELEMENT AND PROCESS FOR ITS PREPARATION

(75) Inventors: Rolando Ferrini, Lausanne (CH); Urs Fuerholz, Marly (CH); Olivier Nicolet, Cossonay (CH); Marc Pauchard, Düdingen (CH); Juliette Perrenoud, Lausanne (CH); Libero Zuppiroli, Bonvillars (CH)

(73) Assignee: Ilford Imaging Switzerland GmbH (CH)

( * ) Notice: Subject to any disclaimer, the term of this patent is extended or adjusted under 35 U.S.C. 154(b) by 222 days.

(21) Appl. No.: 12/584,884

(22) Filed: Sep. 14, 2009

(65) Prior Publication Data
US 2010/0102251 A1     Apr. 29, 2010

(30) Foreign Application Priority Data
Sep. 12, 2008    (EP) .................... 08164280

(51) Int. Cl.
*H05B 33/00* (2006.01)
(52) U.S. Cl. ............... 250/484.4; 250/458.1; 250/459.1; 250/461.1
(58) Field of Classification Search ............... 250/484.4, 250/458.1, 459.1, 461.1
See application file for complete search history.

(56) References Cited

U.S. PATENT DOCUMENTS

| | | | |
|---|---|---|---|
| 4,583,822 A | 4/1986 | Southwell | |
| 4,759,990 A | 7/1988 | Yen | |
| 5,055,019 A | 10/1991 | Meyer et al. | |
| 6,773,771 B1 | 8/2004 | Ashida et al. | |
| 6,995,371 B2 * | 2/2006 | Garber et al. | 250/330 |
| 7,791,157 B2 * | 9/2010 | Cho et al. | 257/436 |
| 7,923,054 B2 * | 4/2011 | Dutta et al. | 427/2.11 |
| 2006/0078696 A1 | 4/2006 | Furholz | |
| 2006/0278883 A1 | 12/2006 | Negley | |
| 2007/0031685 A1 | 2/2007 | Ko et al. | |
| 2007/0241355 A1 | 10/2007 | Chua | |
| 2008/0113213 A1 | 5/2008 | Beer et al. | |

FOREIGN PATENT DOCUMENTS

| | | |
|---|---|---|
| DE | 3823895 | 12/1989 |
| DE | 10020346 | 11/2000 |
| EP | 0663620 | 7/1995 |
| EP | 1022587 | 7/2000 |
| EP | 1422282 | 5/2004 |
| EP | 1475217 | 11/2004 |
| EP | 1480278 | 11/2004 |
| EP | 1492389 | 12/2004 |
| EP | 1655348 | 5/2006 |
| JP | 11-199781 | 7/1999 |
| JP | 2001-250963 | 9/2001 |
| WO | WO 00/20221 | 4/2000 |

(Continued)

OTHER PUBLICATIONS

S. Brunauer, P.H. Emmet and I. Teller, "Adsorption of Gases in Multimolecular Layers", Journal of the American Chemical Society 60, 309-319 (1938).

(Continued)

*Primary Examiner* — Christine Sung
(74) *Attorney, Agent, or Firm* — Onofrio Law; Dara L. Onofrio, Esq.

(57) ABSTRACT

The present invention has the objective to increase the light output yield of a light conversion foil in comparison to the impacting light. There is proposed to realize the following effects in the various layers of a conversion foil, individually or in combination, namely the isolation of the conversion layer (3) from the support (1) by a, preferably microporous and mesoporous, interlayer (2), and the incorporation of scattering centers (4) either into this interlayer, or into the conversion layer, or into both.

13 Claims, 9 Drawing Sheets

FOREIGN PATENT DOCUMENTS

| | | |
|---|---|---|
| WO | WO 01/41225 | 6/2001 |
| WO | WO 03/064557 | 8/2003 |
| WO | WO 2005/051846 | 6/2005 |
| WO | WO 2005/100016 | 10/2005 |
| WO | WO 2006/114077 | 11/2006 |
| WO | WO 2006/127030 | 11/2006 |
| WO | WO 2007/011154 | 1/2007 |

OTHER PUBLICATIONS

M.M. G. Antonisse, P.H. Binda and S. Udding-Louwrier, "Application of UV-curable powder coatings on paperlike substrates", American Ink Maker 79(5), 22-26 (2001).

M. Guillaumee, M. Liley, R. Pugin and R.P. Stanley, "Scattering of light by a sub-monolayer of randomly packed dielectric microspheres giving color effects in transmission", Proceedings SPIE 6988, 69881I (2008).

M. Pauchard, A. Devaux and G. Calzaferri, "Dye-Loaded zeolite L Sandwiches as Artificial Antenna Systems for Light Transport", Chemistry—A European Journal 6, 3456-3470 (2000).

Pp. 297-302, 76, 77, 132, 133, 168, 169, 170, 171, 184, 185, 190 and 191 of C. Barlocher, W.M. Meier and D.H. Olson, "Atlas of Zeolite Framework Types", Fifth edition, Elsevier (2001), ISBN 04-444-50701-9.

\* cited by examiner

OPTICAL ELEMENT AND PROCESS FOR ITS PREPARATION

FIELD OF THE INVENTION

The present invention relates to an optical element according to the preamble of claim 1, and a process for its preparation.

In particular, the invention relates to flexible materials for optical applications, comprising in a layer package at least one light conversion layer, which can change the spectral composition of incident light by scattering, absorption and photoluminescence.

BACKGROUND OF THE INVENTION

Light conversion layers are used wherever the spectral composition of light sources needs to be changed. In contrast to color filters, which absorb or reflect certain spectral components of light, light conversion layers convert part of the absorbed energy of light and radiate it again at a higher wavelength. It is therefore possible to convert light of low wavelength into light of higher wavelength. The conversion layers contain, for this purpose, one or more conversion dyes which absorb at least part of the light spectrum and are able to convert it by fluorescence or phosphorescence.

This method of light conversion is used for example for the creation or modification of illuminants that are visible to the human eye (light wavelengths between 400 nm and 700 nm). Such illuminants are used wherever light is needed which is visible to the human eye, for example for the illumination of rooms, the illumination of advertisements and security markers, or for the background lighting of LCD screens and mobile phones.

A well-known example of such an illuminant is the fluorescence tube which generates ultraviolet radiation that is invisible to the human eye and which is converted by a light conversion layer into light having a wavelength between 400 nm and 700 nm. The light conversion layer is applied directly to the inner surface of the fluorescence tube and only inorganic phosphors are used as conversion dyes. A further property of these layers is that they need to be impermeable to ultraviolet light and strongly scatter visible light. Therefore, they are not transparent, but opaque.

A further example is a white light emitting diode wherein, for example, blue light is converted in part into yellow-green light by a conversion dye, as described for example in patent application WO 2006/127,030.

Light conversion layers are also used in security markers wherein, for example, ultraviolet light that is invisible to the human eye is converted into visible light. Such a security marker is only visible under an ultraviolet lamp.

Light conversion layers are also used in food production, wherein, for example, the light conversion layers convert sunlight or artificial light in such a way that plant growth is accelerated.

Light conversion layers are also used to change the light spectrum of self-luminescent phosphorescent areas in the dark, as used for example for signaling emergency exits.

All conversion layers have the same objective of efficient conversion of light and of radiation of converted light in a wanted direction. For this purpose, the excitation of the conversion dyes by the light source and the light conversion have to be very efficient. The excited conversion dyes are internal light sources inside the conversion layer. The converted light then needs to be extracted from the layer. The ratio of emitted light quantity and of absorbed light quantity is called external fluorescence efficiency. In order to optimize the function of the conversion layers, it would be an advantage it the individual steps (excitation, conversion, extraction) could be optimized independently as far as possible.

Inorganic phosphors having particle sizes in the micrometer range, embedded in a transparent polymer, are used in widely-used conversion layers, as described for example in patent applications JP 11-199,781 or US 2007/0,031,685.

Due to the difference of the refraction index between the particles and the polymer, and particle size, as described in these documents, the conversion layers prepared in this way are opaque and considerably scatter visible light. This considerably hinders or even prevents separate control of absorption and emission by the conversion dyes. Although the used phosphors have often very high quantum yields, the external efficiency of light conversion by the conversion layers is considerably deteriorated, because a large amount of the converted light cannot escape from the conversion layer or is radiated in an unwanted direction.

There is a further problem in the case where more than one conversion dye is used. The propagation behavior of the light in the conversion layer depends on the used wavelength. Therefore, the optical properties of the conversion layers should be adjusted to the used conversion dye. It is also necessary that the absorption of the excitation light by the different conversion dyes and the reciprocal filter effect on the emitted radiation should be carefully controlled.

In order to attain this objective, multi-layer systems containing the different conversion dyes have been developed, wherein the optical properties of the obtained conversion film may be controlled selectively.

The multi-layer systems, described for example in patent applications EP 1,480,278 or WO 2006/114,077, allow only a very limited control of optical properties due to strong scattering. In particular, only the sequence of the conversion layers containing the two conversion dyes is used to increase conversion efficiency. However, the scattering behavior and light coupling out of light may be controlled only marginally.

By using organic dyes in place of the inorganic phosphors mentioned above, transparent conversion layers having only moderate scattering of light may be prepared. Such a layer is described in patent application EP 1,422,282.

Beside the use of organic fluorescence dyes, the use of inorganic phosphors in combination with polymers having a high refraction index, such as, for example, polyimide, for the preparation of nearly transparent layers is described in patent application WO 2005/100,016. The required transparency is obtained by the adjustment of the refraction indices of the polymer and the conversion dye. Although nearly transparent layers may be prepared in this way, the distribution of the conversion dyes in the layers is defined by particle size. The layer consists therefore of zones of micrometer size having incorporated a conversion dye and equally big zones of inactive transparent polymer, leading to a very inhomogeneous absorption and emission behavior of such layers.

Patent application WO 2005/051,846 describes the preparation of inorganic phosphor particles having a size between 20 nm and 800 nm. Such particles would be very suitable for the preparation of transparent conversion layers, because the particles are small in relation to the wavelength of the used light and scattering would therefore be lowered considerably.

However, if such transparent conversion layers are used, the problem appears that the converted light in multi-layers is captured by shafting and is mainly radiated in a sidewise direction. This is undesirable in the applications described above.

The partial suppression of radiation in a sidewise direction by shafting by the use of a microporous and mesoporous layer having a low refraction index is described in patent application EP 1,492,389.

In patent application WO 2005/100,016, the use of multi-layers also is described, wherein, based on transparent conversion films, coupling out of light is purposefully controlled by the use of supplementary optical elements. The materials and preparation processes described therein are not suitable for cost-efficient and large-scale production of such conversion films.

SUMMARY OF THE INVENTION

The objective of the invention is to provide an optical element having an increased yield of light radiated in a desired direction relative to the quantity of incident light.

This objective is achieved by an optical element as described above, further having the features described in the characterizing portion of claim 1.

In particular, this objective is achieved by an optical element having a transparent support and at least one transparent optical conversion layer containing substances which absorb light of a certain wavelength and may emit light of another wavelength, wherein this optical element is characterized by the presence of at least one supplementary layer situated between the support and the optical conversion layer, and by the presence of scattering centers in the supplementary layer or in the optical conversion layer.

According to one embodiment of the invention, the optical element comprises a microporous and mesoporous interlayer.

Preferably, the support, the interlayer and the optical conversion layer are flexible, so that the optical element has the form of a flexible foil.

In one embodiment of the invention, the optical element comprises a support, a first interlayer and a first conversion layer on top of it and, on top of it, a second interlayer and, on top of it, a second conversion layer.

In another embodiment of the invention, the optical element comprises, on top of the second conversion layer, a third interlayer and, on top of it, a third conversion layer.

In a further embodiment of the invention, the optical element comprises, on top of the first interlayer, two conversion layers in direct contact.

The optical element may also comprise a first and a second interlayer, separated by two conversion layers in direct contact.

Further, the optical element may comprise, on top of the second conversion layer, a third conversion layer without an interlayer between these conversion layers.

Preferably, in an optical element as described, wherein the scattering centres are incorporated into the optical conversion layer or the optical conversion layers, these scattering centres may consist of at least one kind of particles selected from the group consisting of PbS, $TiO_2$, $SiO_2$, $Al_2O_3$, AlOOH, $ZrO_2$, ZnO, $SnO_2$, a mixed oxide of indium tin oxide, hollow microspheres or aerogel particles, each having a mean particle size between 200 nm and 10'000 nm.

Alike, in an optical element as described, wherein the scattering centers are incorporated into the interlayer or the interlayers, these scattering centers may be of the same material as the interlayer, but leading to a different pore size distribution, or of at least one kind particles selected from the group consisting of PbS, $TiO_2$, $SiO_2$, $Al_2O_3$, AlOOH, $ZrO_2$, ZnO, $SnO_2$, a mixed oxide of indium tin oxide, hollow microspheres or aerogel particles, each having a mean particle size between 200 nm and 10'000 nm.

The optical element may comprise supplementary layers, such as an antireflection layer applied to the support, an adhesive layer, a release layer on the adhesive layer or a stripping layer.

The optical element may comprise in the interlayer or the interlayers and/or the conversion layer or conversion layers, conversion dyes.

The optical element may be provided, on top of the uppermost conversion layer, with optical elements such as Fresnel lenses, microlenses, polymer spheres or a supplementary layer, which further improve light extraction and influence the repartition of radiated light.

The optical element may comprise supplementary ingredients in one or more layers such as luminescent or light absorbing compounds.

The optical element may be manufactured by a process consisting of the following process steps:
Provision of a flexible transparent support, applying an aqueous, colloidal dispersion of the interlayer material containing all necessary ingredients at a temperature between 0° C. and 100° C., preferably at a temperature between 15° C. and 60° C., by coating;
Applying a generally aqueous coating solution of the conversion layer containing all necessary ingredients at a temperature between 0° C. and 100° C., preferably at a temperature between 15° C. and 60° C., by coating;
Drying of the coated layer after each coating step generating a layer, or after coating of several or all layers, by air, infrared radiation, microwaves or thermal contact or a mixture thereof.

Other objects, features and advantages of the present invention will be apparent when the detailed description of the preferred embodiments of the invention are considered with reference to the drawings which should be construed in an illustrative and not limiting sense as follows:

DETAILED DESCRIPTION OF THE INVENTION

In the following, the invention will be described in detail using figures and examples.

In this document, the notions for porosity according to IUPAC nomenclature are used:

Classification of porous materials according to their pore size: microporous: pores <2 nm; mesoporous: pore size between 2 nm and 50 nm; macroporous: pores >50 nm. In the case where the where the porosity is not specified otherwise, the pore size is not known or the porosity may be situated in the whole range: microporous, mesoporous or macroporous. Even if porosity is specified, this does not exclude that the material also contains a small part of compounds with non-specified porosities. A material is defined as being "non-porous" in the case where the ratio of the pore volume to the total volume is below 4%.

Figure 1:
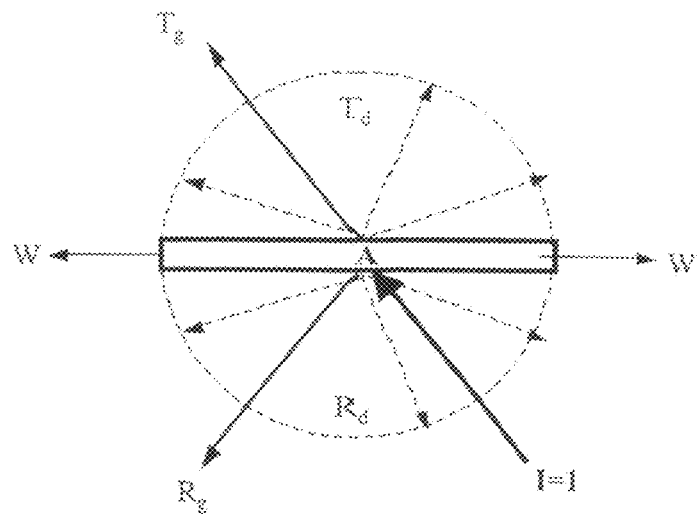
FIG. 1 schematically shows a conversion foil with all the alternatives how the foil may influence the excitation light.

FIG. 1 is a schematic representation of a conversion foil, onto which monochromatic light with intensity I=1 impacts and it shows all the alternatives how this light can be influenced by the conversion foil. The basic rule is that the sum of the impacting light must be the same as the sum of the extracted and of the absorbed light, wherein the impacting light is marked 1, therefore $1=R_g(\lambda)+R_d(\lambda)+T_g(\lambda)+T_d(\lambda)+A(\lambda)+W(\lambda)$; where $R_g(\lambda)$ designates directional reflection, $R_d(\lambda)$ designates diffuse reflection, $T_g(\lambda)$ designates directional transmission, $T_d(\lambda)$ designates diffuse transmission, $A(\lambda)$ designates absorption and $W(\lambda)$ designates shafting in the foil.

Figure 2:
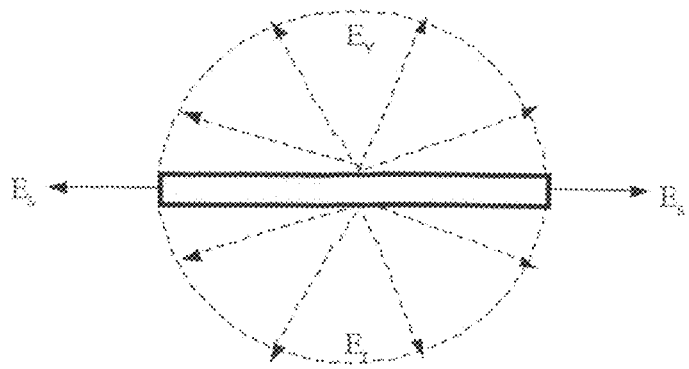
FIG. 2 schematically shows a conversion foil with all the alternatives how the converted light may be radiated.

FIG. 2 is a schematic representation of all the alternatives how the converted light may be radiated by the conversion foil. $E_v$ designates emission in the forward direction, $E_r$ designates emission in the backward direction, $E_s$ designates emission in a sidewise direction.

Figure 3A:
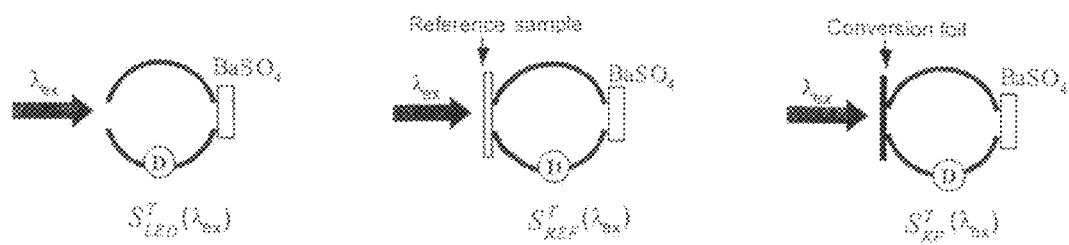
FIGS. 3a and 3b show the measurement set-up for the determination of absorption, transmission, reflection and shafting.
Figure 3B:
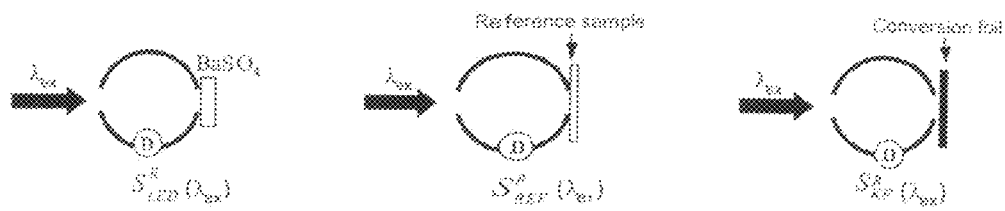

FIG. 3a shows a measurement set-up for measurement of transmission, and FIG. 3b shows a measurement set-up for measurement of reflection. The arrow represents excitation light, the sphere represents the integrating sphere, wherein the light emitted by the sample is integrated and directed onto a detector D. The sample is irradiated by a light source (for example with a mean wavelength of 450 nm) and the attenuation of this light by the sample is measured. The integrating sphere collects the transmitted light at all dihedral angles ($S^T_{REF}(\lambda_{ex})$ or $S^T_{REF}(\lambda_{ex})$). The transmission of a sample is determined by a division of this signal by the signal of the undisturbed light source without sample ($S^T_{LED}(\lambda_{ex})$). The reflection of a sample is determined by measuring the reflected light of the sample ($S^R_{REF}(\lambda_{ex})$ or $S^R_{KF}(\lambda_{ex})$) and dividing it by the reflected light of an ideal diffuse reflector ($S^R_{LED}(\lambda_{ex})$). With this method, the transmission and reflection values of samples with or without incorporated conversion dyes may be determined. The values of rafting may be calculated from the measurements of reflection and transmission of a comparative sample without incorporated conversion dye under the assumption that absorption at the impacting wavelength is equal to zero:

$$W^{REF}(\lambda)=1-T^{REF}(\lambda)-A^{REF}(\lambda); \text{ where } A^{REF}(\lambda)=0$$

The values of a sample with incorporated conversion dye may be calculated from the measurements of reflection and transmission of a sample under the assumption that the value of rafting is the same as in the corresponding reference sample without incorporated conversion dye:

$$A^{KF}(\lambda)=1-T^{KF}(\lambda)-R^{KF}(\lambda)-W^{KF}(\lambda); \text{ where } W^{KF}(\lambda)=W^{REF}(\lambda)$$

Figure 4:
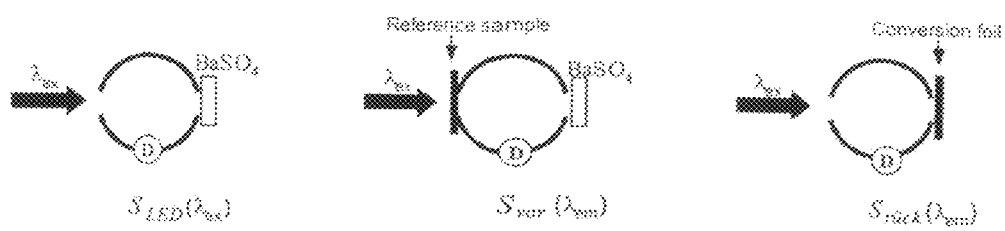
FIG. 4 shows the measurement set-up for the determination of emitted fluorescence radiation.

FIG. 4 shows a measurement set-up for measurement of emitted fluorescence. The converted light, by the conversion foil, having a higher wavelength in comparison to the irradiating excitation light, is measured ($S_{vor}(\lambda_{em})$ or $S_{rück}(\lambda_{em})$) and divided by the intensity of the irradiating light at excitation wavelength ($S_{LED}(\lambda_{ex})$). If the conversion foil is situated in front of the integrating sphere, the intensity of fluorescence radiated in the forward direction is obtained. If the conversion foil is situated on the other side of the integrating sphere, the intensity of fluorescence radiated in the backward direction is obtained.

Figure 5:
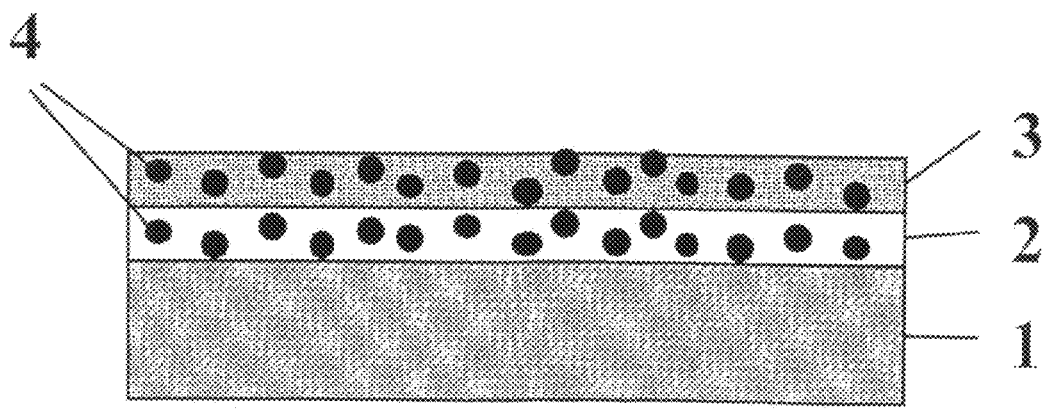
FIG. 5 shows the smallest unity of the conversion foil according to the invention.

FIG. 5 shows the smallest unity of the conversion foil according to the invention, consisting of a transparent flexible support (1), a microporous and mesoporous layer (2) applied directly to the support, a conversion layer (3) applied directly thereon and scattering centers (4) purposefully introduced into the layers (2) and (3). According to the invention, the scattering centers (4) may be present in both layers or only in one of the two layers (2) and (3).

FIGS. 6a to 6e show different alternatives of conversion foils having several conversion layers built up from the smallest unity presented in FIG. 5.

(a) with a second conversion layer (3b) on top of the first conversion layer (3a);
(b) with a second interlayer (2b) on top of the first conversion layer (3a) and a second conversion layer (3b) on top of it;
(c) with a second conversion layer (3b) on top of the first conversion layer (3a), on top of it a second interlayer (2b) and a third conversion layer (3c) on top of it;
(d) with a second interlayer (2b) on top of the first conversion layer (3)a, on top of it a second conversion layer (3b) and a third conversion layer (3c) on top of it;
(e) with a second interlayer (2b) on top of the first conversion layer (3a), on top of it a second conversion layer (3b), a third interlayer (2c) on top of it and a third conversion layer (3c) on top of it.

All conversion layers and interlayers may have different thickness and compositions, limited by the described properties of such layers.

Figure 7:
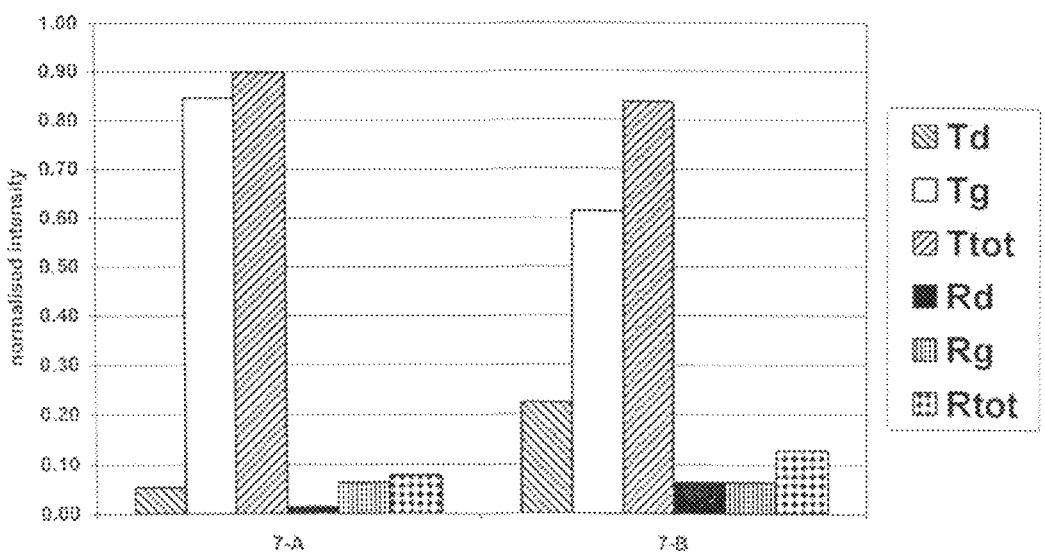
FIG. 7 shows the measured transmission and reflection values of two conversion foils.

FIG. 7 shows the directed measured transmission $T_g(\lambda)$, the diffuse transmission $T_d(\lambda)$, the total transmission $T_{tot}(\lambda)$, the directed reflection $R_g(\lambda)$, the diffuse reflection $R_d(\lambda)$ and the total reflection $R_{tot}(\lambda)$ of two conversion foils of Example 7, once without (Example 7-A) and once with incorporated $TiO_2$ scattering centres (Example 7-B) for light of wavelength 450 nm.

Figure 8:
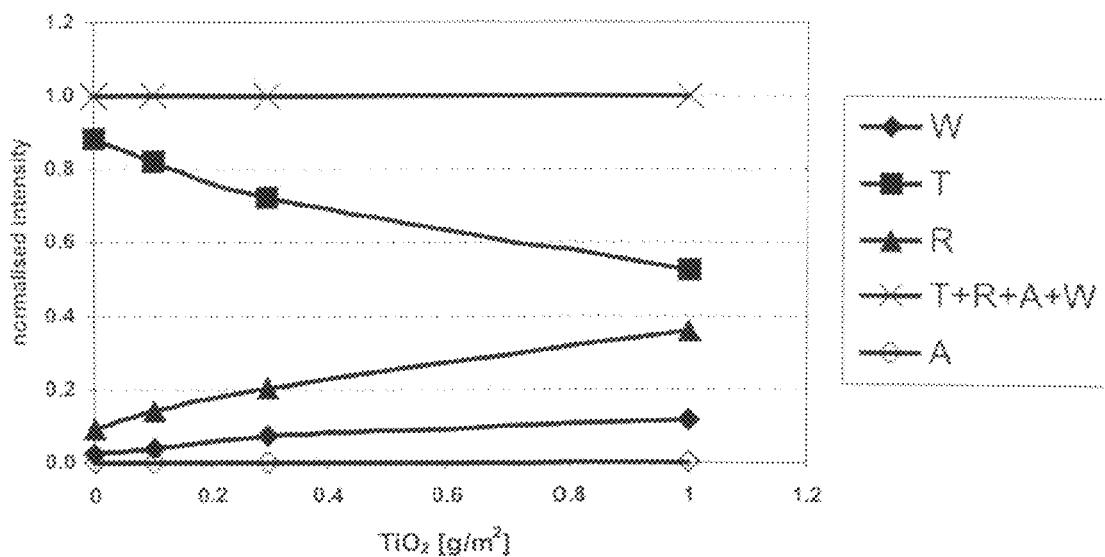
FIG. 8 shows the influence of the concentration of $TiO_2$ scattering centers in the conversion layer of a reference conversion foil without conversion dye on excitation light of wavelength 450 nm.

FIG. 8 shows the influence of the concentration of $TiO_2$ scattering centers in the conversion layer of a reference conversion foil without conversion dye (examples 1-A to 1-D) on light distribution of perpendicularly impacting blue light of wavelength 450 nm with intensity 1.

Figure 9:
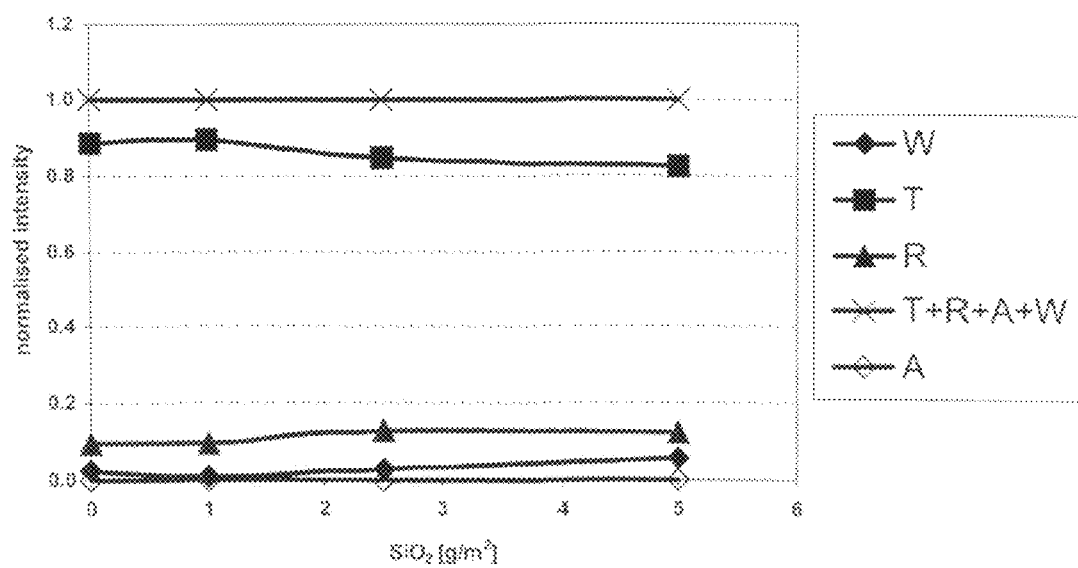
FIG. 9 shows the influence of the concentration of $SiO_2$ scattering centers in the conversion layer of a reference conversion foil without conversion dye on excitation light of wavelength 450 nm.

FIG. 9 shows the influence of the concentration of $SiO_2$ scattering centers in the conversion layer of a reference conversion foil without conversion dye (examples 2-A to 2-D) on light distribution of perpendicularly impacting blue light of wavelength 450 nm with intensity 1.

Figure 10:
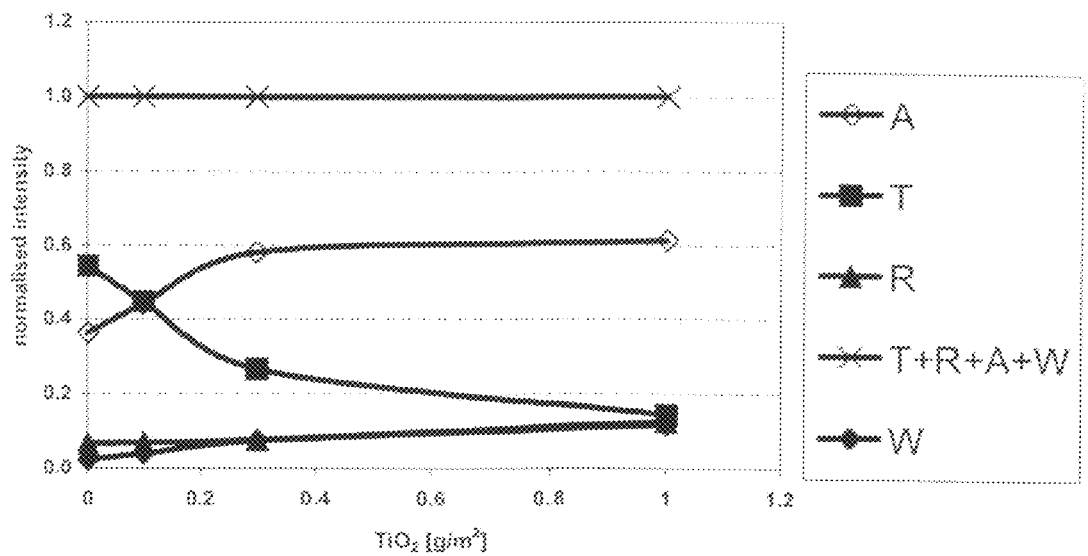
FIG. 10 shows the influence of the concentration of $TiO_2$ scattering centers in a conversion layer with incorporated conversion dye on excitation light of wavelength 450 nm.

FIG. 10 shows the influence of the concentration of $TiO_2$ scattering centers in a conversion layer with incorporated conversion dye (examples 1-E to 1-H) on light distribution of perpendicularly impacting blue light of wavelength 450 nm with intensity 1.

Figure 11:
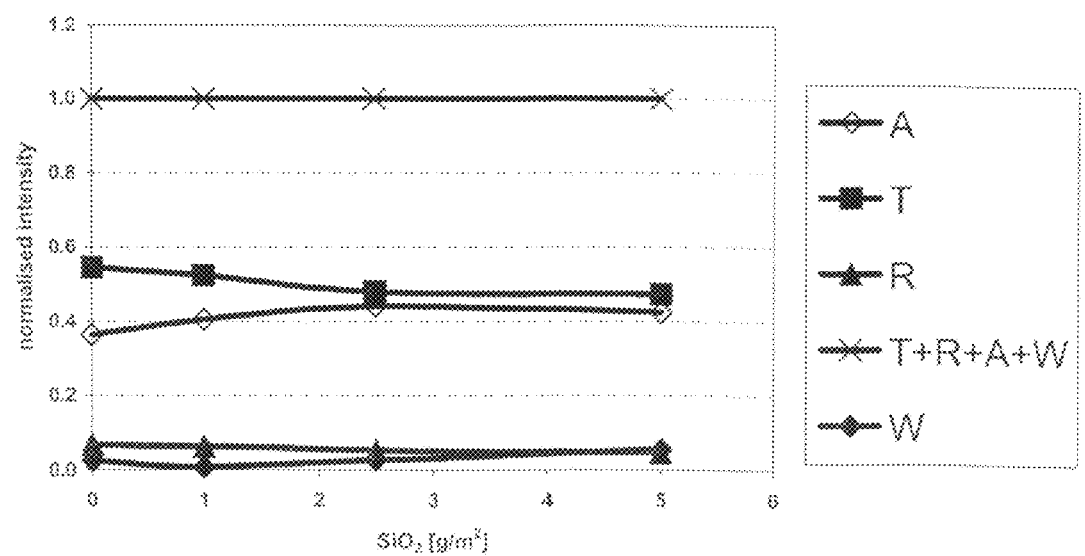
FIG. 11 shows the influence of the concentration of $SiO_2$ scattering centers in a conversion layer with incorporated conversion dye on excitation light of wavelength 450 nm.

FIG. 11 shows the influence of the concentration of $SiO_2$ scattering centers in a conversion layer with incorporated conversion dye (examples 2-E to 2-H) on light distribution of perpendicularly impacting blue light of wavelength 450 nm with intensity 1.

Figure 12:
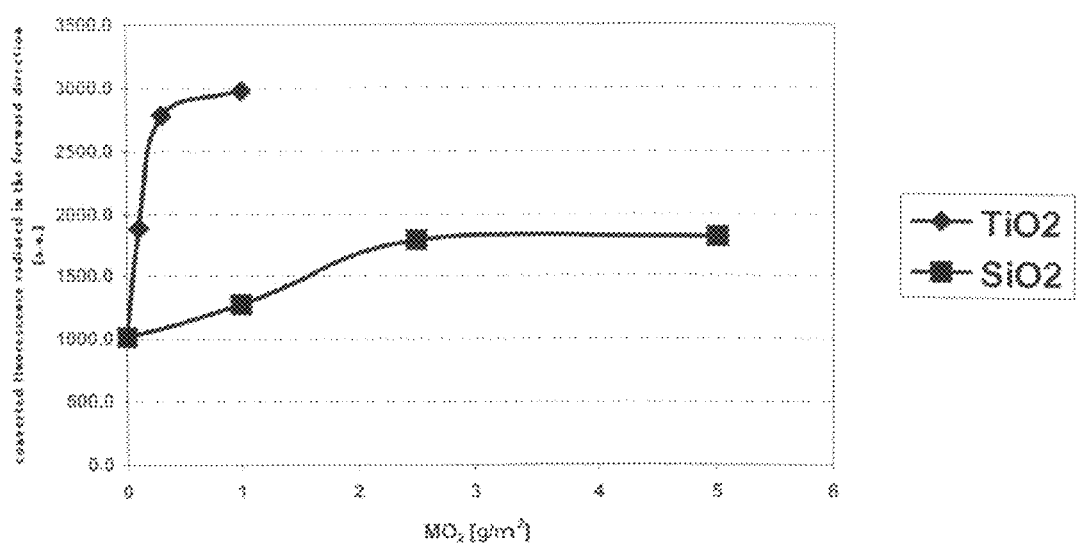
FIG. 12 shows the influence of the concentration of $TiO_2$ and $SiO_2$ scattering centers in a conversion layer with incorporated conversion dye on radiated fluorescence in the forward direction.

FIG. 12 shows the influence of the concentration of $TiO_2$ and $SiO_2$ scattering centers in a conversion layer with incorporated conversion dye (examples 1-E to 1-H, respectively examples 2-E to 2-H) on the intensity of fluorescence radiated in the forward direction.

Figure 13:
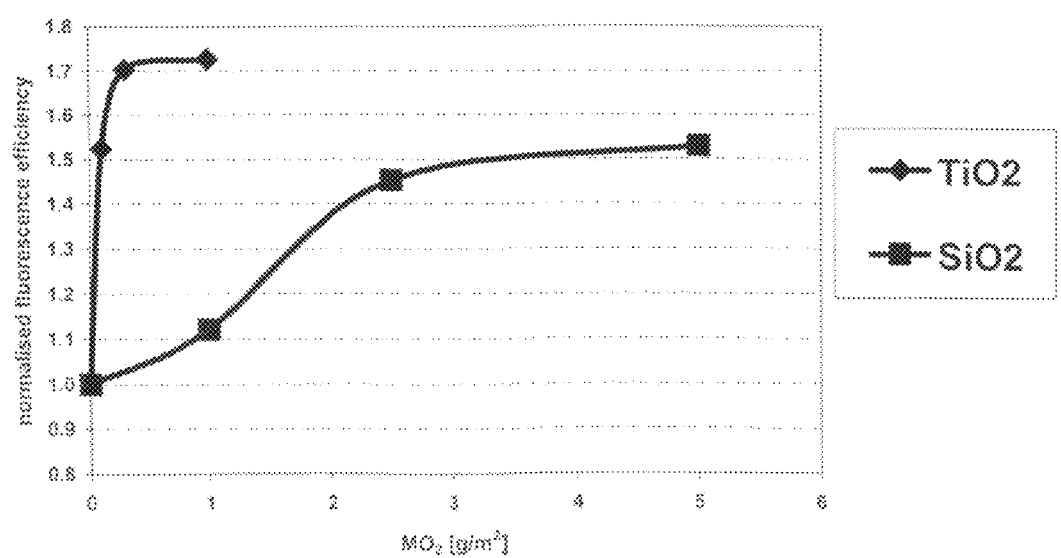
FIG. 13 shows the influence of the concentration of $TiO_2$ and $SiO_2$ scattering centers in a conversion layer with incorporated conversion dye on fluorescence efficiency.

FIG. 13 shows the influence of the concentration of $TiO_2$ and $SiO_2$ scattering centers in a conversion layer with incorporated conversion dye (examples 1-E to 1-H, respectively examples 2-E to 2-H) on fluorescence extraction efficiency (intensity of fluorescence radiated in the forward direction divided by absorption).

Figure 14:
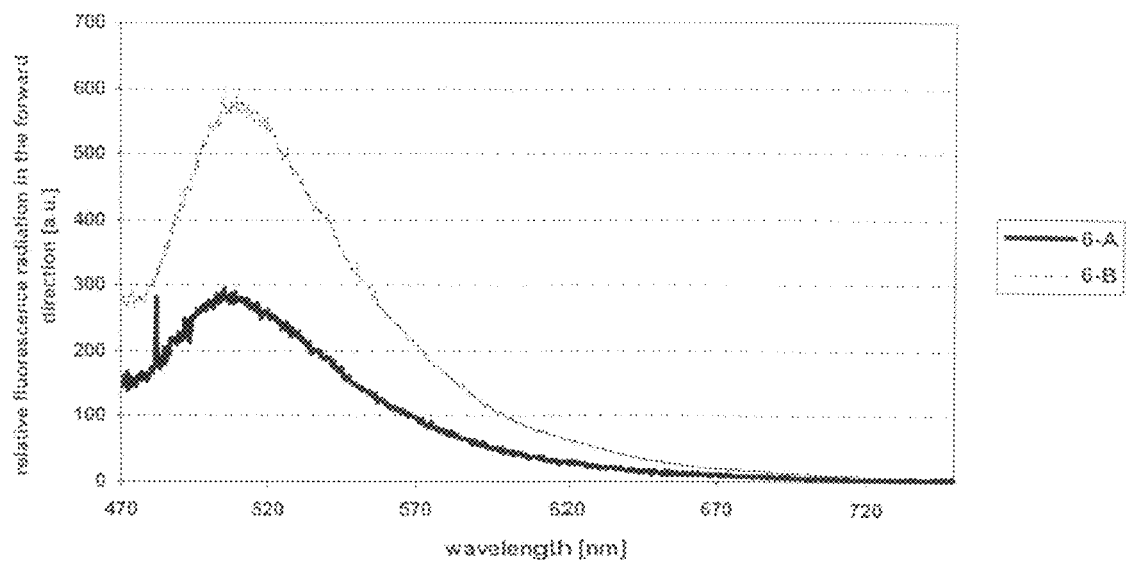
FIG. 14 shows the fluorescence radiated in the forward direction of two samples having different surface roughness of the conversion layer.

FIG. 14 shows the fluorescence radiated in the forward direction of two samples having a different surface roughness of the conversion layer (Examples 6-A and 6-B).

Figure 15:
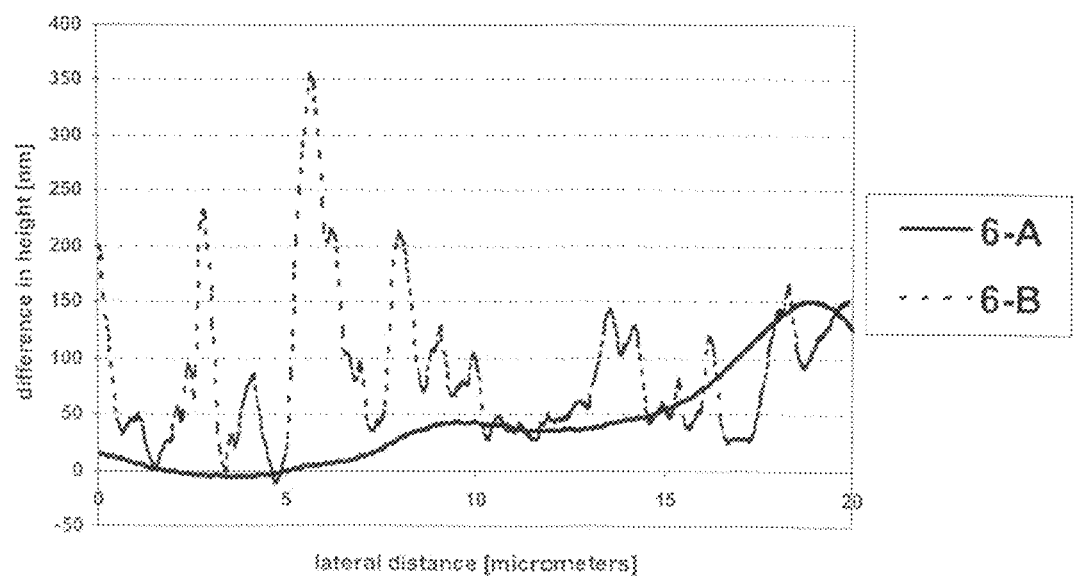
FIG. 15 shows the roughness profile of the samples of FIG. 14, measured by atomic force microscopy.

FIG. 15 shows the roughness profile of the samples 6-A and 6-B, measured by atomic force microscopy.

Figure 16:
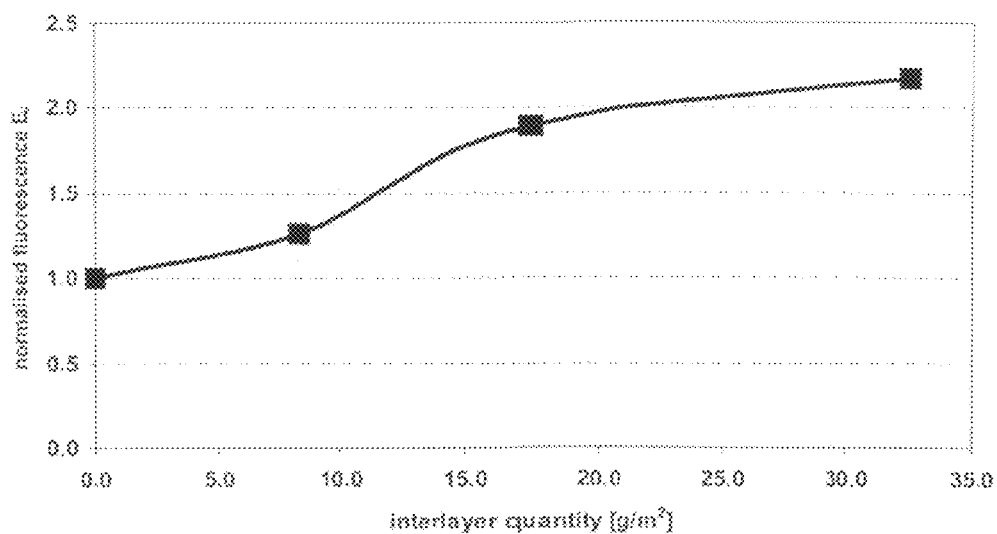
FIG. 16 shows the influence of the layer thickness of a micropourous and mesoporous interlayer on the intensity of fluorescence radiated in the forward direction.

FIG. 16 shows the influence of the layer thickness of a micropourous and mesoporous interlayer of several conversion foils on the intensity of fluorescence radiated in the forward direction (Examples 3-A to 3-D).

Figure 17:
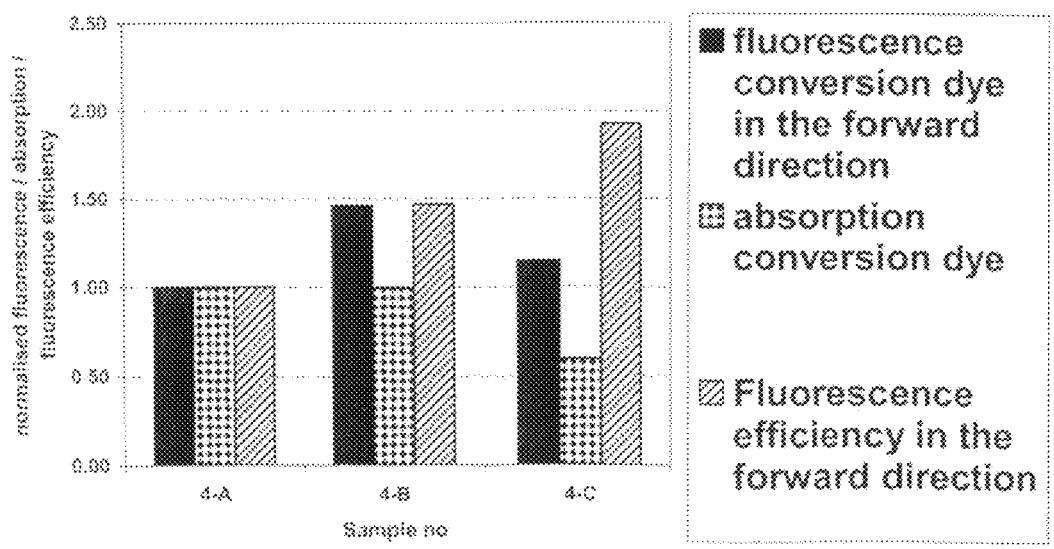
FIG. 17 shows the influence of incorporated scattering centers in a microporous and mesoporous interlayer of several examples on the absorption, the fluorescence of the conversion dye and the fluorescence extraction efficiency.

FIG. 17 shows the influence of incorporated scattering centers in a microporous and mesoporous interlayer of several examples on the relative intensity of fluorescence radiated in the forward direction, the absorption and the relative fluorescence extraction efficiency (Examples 4-A to 4-C).

Figure 18:
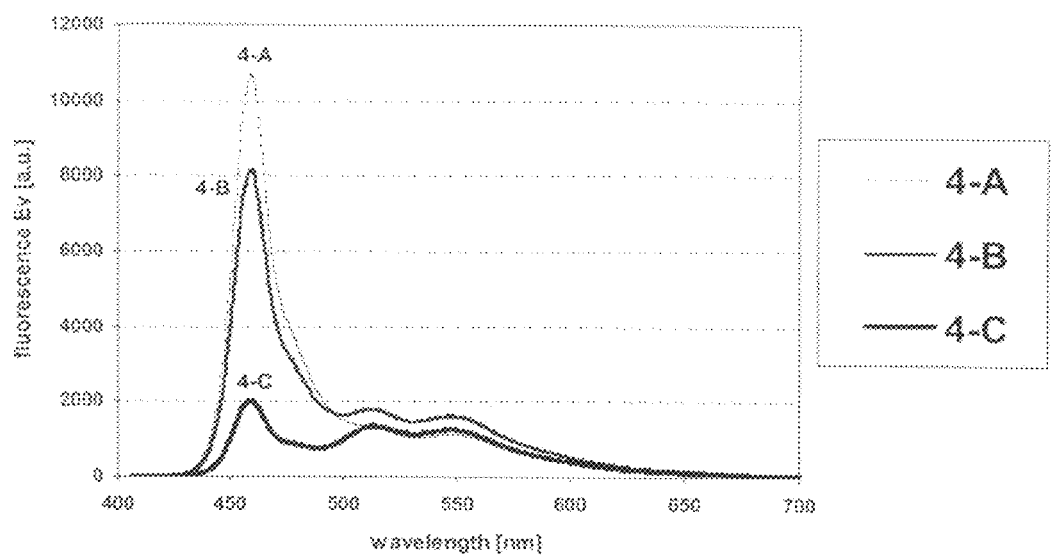
FIG. 18 shows the measured fluorescence spectra of the examples of FIG. 17.

FIG. 18 shows the measured fluorescence spectra of examples 4-A to 4-C of FIG. 17.

Figure 19:
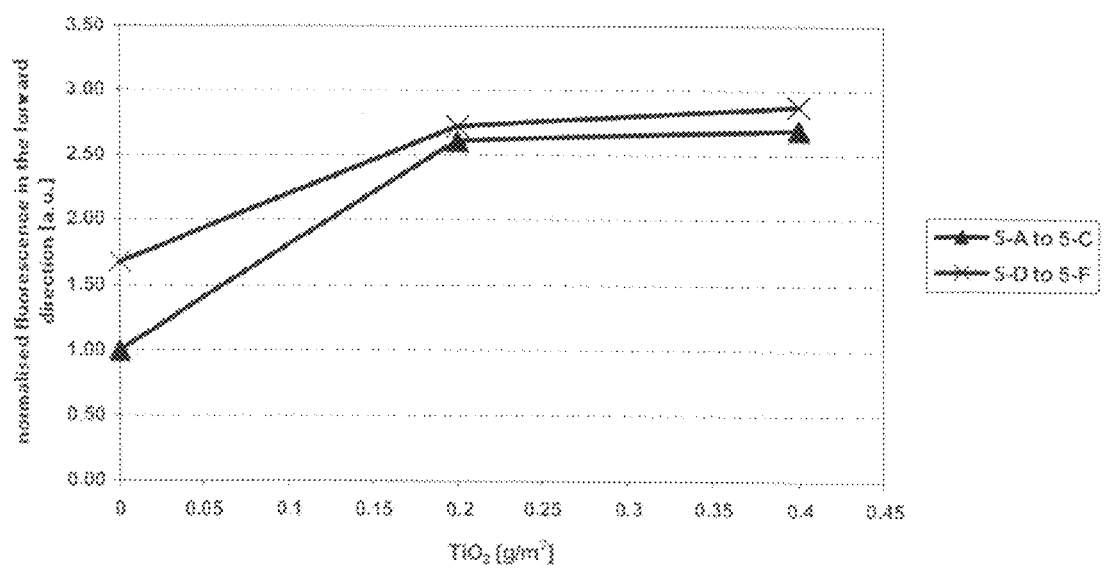
FIG. 19 shows the influence of the concentration of $TiO_2$ scattering centers incorporated into a conversion layer on the intensity of fluorescence radiated in the forward direction in the presence or absence of a microporous and mesoporous interlayer.

Finally, FIG. 19 shows the influence of the concentration of $TiO_2$ scattering centers incorporated into a conversion layer on the intensity of fluorescence radiated in the forward direction in the absence of a microporous and mesoporous interlayer (Examples 5-A to 5-C) and in the presence of a microporous and mesoporous interlayer (Examples 5-D to 5-F).

As stated, the objective of the invention is to provide flexible conversion foils for the transformation or adaptation of the light spectrum having maximal conversion efficiency.

The spectral region of light sources and of the converted wavelengths that is relevant to the invention is situated between 200 nm and 2'000 nm, preferably between 200 nm and 700 nm. The conversion foils according to the invention have one or more conversion layers in a multi-layer system together with other optical layers in order to convert the light efficiently and to radiate the converted light efficiently in the forward direction. These conversion foils have an excellent mechanical flexibility and may be manufactured, according to the invention, in a cost-effective way in big amounts and on big areas. Furthermore, it is feasible to optimize the absorption, the light conversion and the spatial radiation of light by optimization of suitable layer compositions and a suitable layer assembly.

Surprisingly, we have found that such conversion foils may be obtained by a combination of thin conversion layers, microporous and mesoporous layers having a low diffraction index and purposefully incorporated scattering centers.

For better understanding, there will be a short explanation of the influence of a conversion foil on the light of a light source. As simplification, it will be assumed that a monochromatic light source (for example blue light with wavelength of 450 nm) is irradiating the foil in a directed way with normalized intensity 1. Light distribution may be represented schematically in the following way:

With reference to FIG. 1 described above, the conversion foil influences the spatial light distribution of impacting light with wavelength $\lambda$ and may attenuate light intensity by absorption. It will be presumed that $$1 = R_g(\lambda) + R_d(\lambda) + T_g(\lambda) + T_d(\lambda) + A(\lambda) + W(\lambda)$$

wherein $R_g(\lambda)$ is directed reflection, $R_d(\lambda)$ is diffuse reflection, $T_g(\lambda)$ is directed transmission, $T_d(\lambda)$ is diffuse transmission, $A(\lambda)$ is absorption, $W(\lambda)$ is rafting in the foil.

The exact distribution of light depends on the optical properties of the conversion foil.

In the case where the conversion foil, with the exception of the conversion dye, is essentially transparent, a well-known phenomenon occurs. Because the conversion foil has a higher reflection index compared to the surroundings (air), the foil acts as a wave-guide. The irradiating light may under certain conditions couple into this wave-guide, having as consequence that part of the irradiating light leaves the foil in a sidewise direction.

In the case where the conversion dye absorbs part of the irradiating light and radiates it again, it is acting as an internal light source. The radiated light may be emitted in a backward direction (towards the light source), in a forward direction or in a sidewise direction, or it may be absorbed by another conversion dye. The radiation of light in a sidewise direction is very well known in transparent conversion foils and it is a consequence of the wave-guide properties of such foils. This radiation of light in a sidewise direction may be very disturbing in the case where in an application the radiation of light is desired to be in a perpendicular direction to the film. FIG. 2 schematically shows the spatial distribution of radiated light: $E_F$ is emission in the forward direction, $E_R$ is emission in the backward direction and $E_S$ is emission in a sidewise direction.

With the conversion foil according to the invention, it is feasible to influence the parts of light displayed in FIGS. 1 and 2 simultaneously, this means to increase the absorption, to suppress rafting and to increase light extraction in the forward direction without losing a big part of excitation light by back-reflection. This will be called "Increase of conversion efficiency" in the following.

Principally, the spatial distribution of radiated light could be influenced and the conversion efficiency increased by lowering the thickness of the conversion layer, so that it would no longer be a good wave-guide and by isolating it optically from the transparent support. If an interlayer with low refraction index is introduced between the conversion layer and the support, rafting may be reduced and fluorescence radiated in a perpendicular direction to the foil may be considerably increased. A microporous and mesoporous layer having a low refraction index is very suitable as such an interlayer.

The purposeful introduction of scattering centers is another alternative to influence the spatial distribution of radiated light and to increase conversion efficiency. The introduction of scattering particles may lead to two kinds of scattering centres. Firstly, light may directly be scattered by the particles of the layer, if there is a difference of refraction index between the particles and the surrounding layer material and the particles are not smaller than the corresponding light wavelength. Secondly, the introduction of particles may increase the surface roughness of the layer, leading to increased scattering of light at the surface. Direct scattering in the layer reduces the part of directed transmission and increases the parts of diffuse transmission and reflection. Scattering of the light has the consequence that the optical path in the conversion foil is extended, again leading to an increase of absorption. Scattering suppresses at the same time rafting and boosts light extraction from the foil.

A particularly preferred alternative for influencing the spatial distribution of radiated light and increasing the conversion efficiency is the combination of the two effects described, wherein the conversion layer is optically isolated from the transparent support by an interlayer and scattering centers are purposefully introduced directly into the conversion layer.

A further, particularly preferred alternative for influencing the spatial distribution of radiated light and increasing the conversion efficiency is the introduction of scattering centers outside of the conversion layer. This may be done for example by the introduction of scattering centers into the interlayer having the low refraction index that isolates the conversion layer optically from the support. In this way, fluorescence extraction efficiency may be considerably increased. This may be of interest in the case where the intensity of the excitation light radiated in the forward direction should be reduced without decreasing the intensity of the converted light radiated in the forward direction. In this case, the scattering centers scatter part of the excitation light in the backward direction and an increased part of the converted light in the forward direction and influence in this way the color balance of the light radiated in the forward direction.

A further alternative for influencing the spatial distribution of radiated light and increasing the conversion efficiency is the introduction of a supplementary layer on top of the conversion layer, having a refraction index between the refraction indices of the conversion layer and the surrounding air. This layer reduces the reflection at the boundary layer to the surrounding air and in this way increases light extraction. Such layers are very well known and are used as antireflection layers. Examples of such layers are described for example in patents U.S. Pat. No. 4,759,990 and U.S. Pat. No. 4,583,822.

An alternative for a supplementary increase of the conversion efficiency is the introduction of an antireflection layer having a low refraction index onto the transparent support.

Further, the spatial distribution of radiated light may still be influenced and conversion efficiency increased by providing the surface of the conversion layer with optical elements such as micro lenses, Fresnel lenses or polymer spheres, as described for example in patent applications WO 2007/011'154 and WO 01/41'225 or in the article by M. Guillaumée, M. Liley, R. Pugin and R. P. Stanley in "Scattering of light by a sub-monolayer of randomly packed dielectric microspheres giving color effect in transmission", Proceedings of SPIE 6988, 69881I (2008).

In the following, the invention will be explained in detail for all the layers used in the different embodiments, as well as their compositions and the processes of manufacturing.

Starting with the smallest unit of the conversion foil according to the invention, FIG. 5 shows a transparent flexible support (1), at least one microporous and mesoporous layer (2) applied directly to the support, and at least one conversion layer having purposefully introduced scattering centers applied directly on top of it.

These three layers will be described in detail. The interlayer and the conversion layer will be described with and without scattering centers.

In view of the multitude of the described alternatives, it has to be understood that all the described alternatives of one layer may be combined with all the alternatives of the other layers.

Flexible Supports

A wide variety of flexible supports that are used in the photographic industry are suitable for the materials according to the invention. For the manufacture of the materials according to the invention, all supports used in the manufacture of photographic materials may be used, such as transparent films made from cellulose esters such as cellulose triacetate, cellulose acetate, cellulose propionate or cellulose acetate/butyrate, polyesters such as polyethylene terephthalate or polyethylene naphthalate, polyamides, polycarbonates, polyimides, polyolefins, polyvinyl acetals, polyethers, polyvinyl chloride and polyvinyl sulfones. Polyester film supports, and especially polyethylene terephthalate such as for instance Cronar® manufactured by DuPont Tejin Films or polyethylene naphthalate are preferred because of their excellent dimensional stability.

Supports consisting of acrylonitrile, butadiene and styrene, polycarbonate, polyetherimide, polyether ketone, polymethylmethacrylate, polyoxymethylene and polystyrene may be used as well.

When such supports, in particular polyester, are used, a subbing layer is advantageously applied first to improve the bonding of the layers to the support. Useful subbing layers for this purpose are well known in the photographic industry and include for example terpolymers of vinylidene chloride, acrylonitrile and acrylic acid or of vinylidene chloride, methyl acrylate and itaconic acid. In place of the use of a subbing layer, the surface of the support may be subjected to a corona discharge or a corona/aerosol treatment before the coating process.

All these flexible supports may have a largely transparent electrically conductive layer. Plastic supports having an applied metal layer or a layer of indium tin oxide are preferred.

All these supports may also have three-dimensional structures at their surface.

Microporous and Mesoporous Interlayer

The microporous and mesoporous interlayer of the material according to the invention having the low refractive index and containing inorganic nanoparticles, has a dry thickness between 2 µm and 60 µm, preferably between 5 µm and 50 µm, more preferably between 20 µm and 40.0 µm.

The microporous and mesoporous layers having a low refractive index contain inorganic nanoparticles and, optionally, a small amount of binder and other ingredients. They have, after drying, a defined, measurable pore volume. The pore volume may be determined for example by the use of the BET method. The BET method for the determination of the pore volume has been described by S. Brunauer, P. H. Emmet and I. Teller in "Adsorption of Gases in Multimolecular Layers", Journal of the American Chemical Society 60, 309-319 (1938).

In a simpler method, the pores are filled with a suitable solvent of known density and the pore volume is determined directly from the weight increase of the layer. The pore volume determined in this way for the microporous and mesoporous layers according to the invention is between 0.1 ml/g and 2.5 ml/g, wherein the reference is the unit weight of the microporous and mesoporous layer containing inorganic nanoparticles.

Pore volumes between 0.2 ml/g and 2.5 ml/g determined in this way for the microporous and mesoporous layers of conversion foils according to the invention are preferred, particularly preferred are pore volumes between 0.4 ml/g and 2.5 ml/g.

The refraction index of the microporous and mesoporous layer containing the inorganic nanoparticles is influenced by the porosity. An increase in porosity lowers the refraction index. Theoretically, all values of refraction indices between 1.00 (air) and the refraction index of the used inorganic nanoparticles may be adjusted, for example the value 1.45 for the case where $SiO_2$ is used as inorganic nanoparticle. All relevant values of refractive indices used in practice between 1.05 and 1.40 may be attained in this way.

The effective value of the refraction index may be calculated approximately by taking the volume-averaged sum of the value of the refraction index of the nanoparticle network and the value of the refraction of the gas-filled pores.

For example, a microporous and mesoporous layer having a porosity of 0.80 volume percent consisting mainly of $SiO_2$ nanoparticles having a refraction index of 1.45 and air having a refraction index of 1.00 has an effective refractive index of 1.09.

After applying the coating solution of the microporous and mesoporous layer containing inorganic nanoparticles and having the low refractive index, a three-dimensional network of these nanoparticles is slowly formed during drying. The interstices of this network are filled with the used solvent, respectively dispersing agent, and other optionally used ingredients. Later in the drying step, the solvent used, respectively the dispersing agent, is removed. If sufficiently small amounts of additives, for example binders, are used, the interstices within the aggregates and between the aggregates are conserved and gas-filled pores are created in the nanoparticle network. This three-dimensional network, consisting of two phases, a solid one and a gaseous one, has structures in the sub-micrometer range.

By a purposeful control of the size of these structures, the scattering affects and thereby also the transparency of the layers according to the invention may be influenced. These effects may be characterized, for example, by optical transmission in layers on a transparent polymer support.

Natural, precipitated or fumed metal oxides, metal oxide/hydroxides and natural or synthetic zeolites may be used as inorganic nanoparticles for the preparation of the microporous and mesoporous layers having a low refraction index. $SiO_2$ or $Al_2O_3$, $TiO_2$, ZnO, $ZrO_2$ and $SnO_2$ or the mixed oxide indium tin oxide may be used as metal oxides. AlOOH may be used, for example, as metal oxide/hydroxide. It is also possible to use mixtures of all of these compounds.

Inorganic nanoparticles having a refraction index below 1.70 at a wavelength of 550 nm are preferred. Particularly preferred inorganic nanoparticles are precipitated or fumed silicium dioxide, aluminum oxide, aluminum oxide/hydroxide and the zeolites Zeolite Beta, ZSM-5, Mordenite, LTA (Linde type A), Faujasite and LTL (Linde type L).

Official structure notations of the zeolites mentioned before are listed for example in the book by C. Bärlocher, W. M. Meier and D. H. Olson, "Atlas of Zeolite Framework Types", Fifth edition, Elsevier (2001), ISBN 0-444-50701-9.

The size of the inorganic nanoparticles (primary particles) may be determined by image display methods such as high-resolution transmission electron microscopy or scanning electron microscopy.

The mean particle diameter of the inorganic nanoparticles (primary particles) is preferably between 5 nm and 200 nm, particularly preferred is the size range between 10 nm and 60 nm. The inorganic nanoparticles preferably have a narrow particle size distribution, wherein at least 90% of the primary particles have a diameter that is smaller than the double mean diameter mentioned before and where there are practically no primary particles having a bigger diameter than the triple mean particle diameter mentioned before.

The inorganic nanoparticles are preferably present as loose agglomerates (secondary particles) having a measurable BET pore volume.

Two different types of the particularly preferred silicium dioxide may be used, the first one is precipitated silicium dioxide prepared in a wet process and the second one is fumed silicium dioxide prepared in a gas phase reaction.

Precipitated silicium dioxide may be prepared as a silicium dioxide sol for example in the wet process by metathesis of sodium silicate with an acid or by passing it through a layer of ion-exchange resin, by heating and maturing of this silicium dioxide sol or by gelling of a silicium dioxide sol.

Fumed silicium dioxide is generally prepared by flame pyrolysis, for example by burning silicon tetrachloride in the presence of hydrogen and oxygen. An example of such a fumed silicium dioxide is Aerosil® 200 ($SiO_2$ having its isoelectric point at a value of pH of 2.0), available from DEGUSSA AG, Frankfurt/Main, Germany. This substance has, according to its data sheet, a specific BET surface area of about 200 $m^2$/g and a size of the primary particles of about 12 nm. A further example is CAB-O-SIL® M-5, available from Cabot Corporation, Billerica, USA. This substance has, according to its data sheet, a specific BET surface area of about 200 $m^2$/g and a size of the primary particles of about 12 nm. The agglomerates have a length between 0.2 µm and 0.3 µm.

Fumed silicium dioxide having an average size of the primary particles of at most 20 nm and a specific BET surface area of at least 150 $m^2$/g is preferably used in this invention.

The likewise preferred zeolite Beta is available in the form of nanoparticles of mean size of 30 nm from NanoScape AG, Munich, Germany. The other nanocrystalline zeolites (the mean size of the primary particles is indicated in brackets) ZSM-5 (70 nm to 100 nm), Mordenite (500 nm), LTA (90 nm), Faujasite (80 nm) and LTL (50 nm) are also available from them same source.

Aluminum oxide/hydroxide may be used, for example, as metal oxide/hydroxide. Particularly preferred is pseudo-boehmite.

The aluminum oxide/hydroxides are preferably prepared in a sol-gel process in the complete absence of acids, as described for example in patent DE 3,823,895.

A preferred aluminum oxide is γ-aluminum oxide.

The surface of the inorganic nanoparticles may be modified in order to break up agglomerates of the primary particles that could be present, into smaller units and to stabilize them. The size of the dispersed particles has a considerable influence on the transparency of the microporous and mesoporous layer containing these nanoparticles. The surface modification may also improve the compatibility of the nanoparticle surface with the used binders and/or solvents, respectively the dispersing agents. Such a modification may result in an uncharged, a positively charged or a negatively charged surface.

A preferred method for the surface modification of silicium dioxide, in order to obtain a positively charged surface, is the treatment with polyaluminum hydroxychloride, as described for example in patent application DE 10'020'346. The surface modification of fumed silicium dioxide with aluminum chlorohydrate is described in patent application WO 00/20'221.

Another preferred method of surface modification of silicium dioxide is the treatment with aminoorganosilanes, as described for example in patent application EP 0'663'620.

A particularly preferred method of surface modification of silicium dioxide is described in patent application EP 1'655'348, wherein the surface of silicium dioxide is treated with the reaction products of at least one aminoorganosilane and a compound of trivalent aluminum.

Preferred compounds of trivalent aluminum for the surface modification with the reaction products of at least one aminoorganosilane and a compound of trivalent aluminum are aluminum chloride, aluminum nitrate, aluminum acetate, aluminum formiate and aluminum chlorohydrate.

The amount of the compound of trivalent aluminum typically is between 0.1 percent by weight and 20 percent by weight relative to the amount of silicium dioxide. A value between 0.5 percent by weight and 10 percent by weight is preferred.

Particularly preferred aminoorganosilanes for the surface modification with the reaction products of at least one aminoorganosilane and a compound of trivalent aluminium are 3-aminopropyltrimethoxysilane, N-(2-aminoethyl)-3-aminopropyltrimethoxysilane, (3-triethoxysilylpropyl)-diethylentriamine, 3-aminopropyltriethoxysilane, N-(2-Aminoethyl)-3-amino-propyltriethoxysilane, (3-triethoxysilylpropyl) diethylenetriamine and their mixtures.

The total amount of the aminoorganosilane, respectively the mixture of aminoorganosilanes, typically is between 0.1 percent by weight and 20 percent by weight relative to the amount of silicium dioxide. A value between 0.5 percent by weight and 10 percent by weight is preferred.

The weight ratio between the compound of trivalent aluminum (such as aluminum chlorohydrate) and the aminoorganosilane is preferably chosen in such a way that the desired value of pH is obtained when the two compounds are mixed. A molar ratio between 0.1 and 2.0 is preferred. Particularly preferred is a molar ratio between 0.4 and 1.5, taking into account the number of aluminum atoms and the number of amino groups of the aminoorganosilane.

Fumed silicium dioxide having a size of the primary particles of not more than 20 nm is particularly preferred for the surface modification with the reaction products of a compound of trivalent aluminum (such as aluminum chlorohydrate) and at least one aminoorganosilane.

Dispersion at high shear rates gives an equal distribution of the reaction products on the surface of the silicium dioxide. Furthermore, the rheological behavior of the dispersion is improved.

The microporous and mesoporous interlayers containing inorganic nanoparticles and having the low refractive index contain the inorganic nanoparticles in an amount between 2 $g/m^2$ and 60 $g/m^2$, preferably between 5 $g/m^2$ and 50 $g/m^2$, most preferably between 10 $g/m^2$ and 30.0 $g/m^2$.

The amount of binder present in the microporous and mesoporous layer should be sufficiently low in order to attain the desired porosity, but also sufficiently high in order to obtain mechanically stable, non-brittle coatings well adhering to the flexible support. Amounts up to 60 percent by weight relative to the amount of the inorganic nanoparticles may be used, preferred are amounts between 0.5 percent by weight and 40 percent by weight relative to the total amount of the inorganic nanoparticles in the microporous and mesoporous layer having the low refractive index. Particularly preferred are amounts between 10 percent by weight and 30 percent by weight relative to the total amount of the inorganic nanoparticles in the microporous and mesoporous layer having the low refractive index.

Suitable binders for the microporous and mesoporous layer containing inorganic nanoparticles and having the low refractive index are in general water-soluble hydrophilic polymers.

Synthetic, natural or modified natural polymers such as completely or partially hydrolysed polyvinyl alcohol or copolymers of vinyl acetate and other monomers; modified polyvinyl alcohols; polyvinyl pyrrolidone; polyethylene oxides; homopolymers or copolymers of (meth)acrylamide; polyvinyl acetals; polyurethanes as well as starch, cellulose or modified cellulose such as hydroxyethyl cellulose, carboxymethyl cellulose and gelatin may be used. All these polymers may also be used as mixtures.

Particularly preferred synthetic binders for the microporous and mesoporous layer containing inorganic nanoparticles and having the low refractive index are modified and non-modified polyvinyl alcohol, polyvinylpyrrolidone and their mixtures.

The polymers mentioned above having groups with the possibility to react with a cross-linking agent may be cross-linked or hardened to form essentially water insoluble layers. Such cross-linking bonds may be either covalent or ionic. Cross-linking or hardening of the layers allows for the modification of the physical properties of the layers, like for instance their liquid absorption capacity, their dimensional stability under exposure to liquids, vapors or temperature changes, or their resistance against layer damage and brittleness.

The cross-linking agents or hardeners are selected depending on the type of the water-soluble polymers to be cross-linked.

Organic cross-linking agents and hardeners include for example aldehydes (such as formaldehyde, glyoxal or glutaraldehyde), N-methylol compounds (such as dimethylol urea or methylol dimethylhydantoin), dioxanes (such as 2,3-dihydroxydioxane), reactive vinyl compounds (such as 1,3,5-trisacrylolyl hexahydro-s-triazine or bis-(vinylsulfonyl) ethyl ether), reactive halogen compounds (such as 2,4-dichloro-6-hydroxy-s-triazine); epoxides; aziridines; carbamoyl pyridinium compounds or mixtures of two or more of the above-mentioned cross-linking agents.

Inorganic cross-linking agents or hardeners include for example chromium alum, aluminum alum, boric acid, zirconium compounds or titanocenes.

The layers may also contain reactive substances that cross-link the layers under the influence of ultraviolet light, electron beams, X-rays or heat.

These polymers may be blended with water insoluble natural or synthetic high molecular weight compounds, particularly with acrylate latices or with styrene acrylate latices.

Conversion Layers

Conversion dyes having interesting absorption and emission bands (between 200 nm and 2'000 nm, preferred between 200 nm and 700 nm) will be described in detail in the following.

In this description, conversion dyes are compounds that absorb electromagnetic radiation of a first wavelength and afterwards emit electromagnetic radiation of higher wavelength.

Examples of interesting conversion dyes useful in the invention are soluble compounds that can be incorporated into polymers or oil.

Organic Fluorescence Dyes

There is a nearly unlimited assortment of such dyes. Examples are perylenes (such as dyes known under their trade name Lumogen from the company BASF, Ludwigshafen, Germany: Lumogen F240 Orange, Lumogen F305 Red, Lumogen F083 Yellow, Lumogen F850 Green), Yellow 172 from the company Neelikon Food Dyes & Chemical Ltd., Mumbai, India, India, and dyes such as coumarins (for example Coumarin 6, Coumarin 7, Coumarin 30, Coumarin 153, Basic Yellow 51), napthalimides (for example Solvent Yellow 11, Solvent Yellow 116), Fluorol 7GA, pyridines (for example pyridine 1), pyrromethenes (such as Pyrromethene 546, Pyrromethene 567), uranine, rhodamines (for example Rhodamine 110, Rhodamine B, Rhodamine 6G, Rhodamine 3B, Rhodamine 101, Sulphorhodamine 101, Sulphorhodamine 640, Basic Violet 11, Basic Red 2), cyanines (for example phthalocyanine, DCM), stilbenes (for example Bis-MSB, DPS), available from many traders. Several other dyes, such as acid dyes, basic dyes, direct dyes and dispersion dyes may be used as long as they show a sufficiently high fluorescence quantum yield for the intended use.

The following may also be quoted:

Luminescent organometallic complexes

Fluorescent dendrimers

Organic dye complexes with cyclodextrines

Examples of other interesting conversion dyes for the invention are solid particles that may be dispersed in polymers:

Examples of such conversion dyes are microparticles of inorganic phosphors having a refraction index in the region as the used polymers or nanoparticles of inorganic phosphors: cerium-doped garnets of general formula $A_3X_5O_{12}$:Ce (where A is Y, Gd or Tb; X is Al or Ga, for example $Y_3Al_5O_{12}$:Ce), of formula $Y_3X_5A_{12}$:Ce (where X is Al or Si, A is N or O) or of formula $(Y,Ga)_3(Al,Ga)_5O_{12}$:Ce, ZnS:Cu, orthosilicates, preferably of formula $X_2SiO_4$:Eu (where X is Sr, Ba or Ca), nitrides, oxynitride silicates of formula $XSi_2O_2N_2$:Eu (where X is Sr, Ba or Ca), nitride silicates (such as for example $Ca_2Si_5N_8$:Eu, $Sr_2Si_5N_8$:Eu and $CaAlSiN_3$:Eu), ionic phosphors (such as for example $SrGa_2Si_5N_8$:Eu$^{2+}$, (Sr, Ca)$_2Si_5N_8$:Eu$^{2+}$, $CaSiAlN_3$:Eu$^{2+}$, $SrSi_2O_2N_2$:Eu$^{2+}$ or SrS:Eu$^{2+}$), $La_2O_2$:Eu, $La_2O_2S$:Eu, $(BaMgAl)_{10}O_{12}$:Eu, Mn, (Se, Ca,Ba,Mg)$_{10}$(PO$_4$)$_6$O$_{12}$:Eu, $Y_2O_2S$:Eu, YVO:Eu,Sm, $SrGa_2S_4$:Eu$^{2+}$, (BaSr)SiO:Eu,M (where M is Ho, Er, Ce or Y), $Ca_{10}(PO_4)_6Cl_2$:Eu$^{2+}$, $Sr_5(PO_4)_3Cl$:Eu or phosphors as described in patent application WO 2005/051,846.

Further examples are inorganic quantum dots, such as for example CdSe, CdS, CdTe, InP, InAs, GaAs, GaN, Si, ZnSe, ZnTe, ZnS, PbSe and mixtures or mixed multi-layer particles thereof.

Other usable conversion dyes of this type are inorganic-organic hybrid materials, as for example organic dyed incorporated into metal oxide particles such as $SiO_2$, $TiO_2$, in microporous and mesoporous materials such as MCM-5 or in zeolites such as LTL and ZSM-5.

Dye doped polymer particles may also be used, such as for example particles, latices or waxes of polyethylene, polypropylene, polytetrafluoroethylene, polyamides, polyesters, polyurethanes, acrylonitriles, polymethacrylates such as for example methyl methacrylate, polyacrylates, polystyrenes, polyvinyl chloride, polyethyleneterephthalate, copolymers of ethylene and acrylic acid, and paraffin waxes (such as for example Polysperse, available from Lawter Int., Belgium). Mixtures of these compounds may also be used as well as polymers such as polystyrene and acrylates, copolymers of ethylene and acrylates, copolymers of styrene and acrylonitrile. The particle size of the latices may be situated between 20 nm and 5'000 nm, preferably between 40 nm and 1'000 nm and most preferably between 50 nm and 500 nm. Polymers such as PMMA (polymethylmethacrylate), PMA (polymethacrylate), PS (polystyrene) or particles as described in patent application WO 03/064'557 may be used.

Examples of other suitable, for the invention interesting conversion dyes are luminescent polymers that may be mixed with other polymers, such as fluorescent organic semiconductor polymers (for example MEH-PPV (poly[2-methoxy-5-2'-ethyl-hexyloxy)-1,4-phenylene vinylene]), CN-PPV (cyano-polyphenylene vinylene), L-PPV (ladder-type poly(paraphenylene) and Superyellow) or polymers with fixed fluorescent organic dyes or organometallic complexes.

All the conversion dyes described above may be used as single compounds or in suitable combinations.

First Embodiment of the Conversion Layer

In a first embodiment of preparation of a conversion layer, the conversion dye is incorporated into a film-forming polymer. Examples of suitable polymers are synthetic, natural or modified natural polymers such as completely or partially hydrolysed polyvinyl alcohol or copolymers of vinyl acetate and other monomers; modified polyvinyl alcohols; (meth) acrylated polybutadiene; homopolymers or copolymers of (meth)acrylamide; polyvinyl pyrrolidone; polyvinyl acetals; polyurethanes as well as starch, cellulose or modified cellulose such as hydroxyethyl cellulose, carboxymethyl cellulose and gelatin or their mixtures.

Preferred synthetic polymers are modified polyvinyl alcohol, polyurethane, (meth)acrylated polybutadiene, copolymers of (meth)acrylamide as well as polyacrylonitriles or their mixtures.

This layer may also comprise, as described above for the microporous and microporous layer having the low refraction index, other suitable additives such as plasticizers or surface-active compounds and it may be hardened or cross-linked.

Second Embodiment of the Conversion Layer

As the microporous and mesoporous layers have a high and cross-linked pore volume accessible from the outside, the conversion layer may also be attained by filling the pores of such a layer with solutions of conversion dyes in solvents having a high vapor pressure or in monomers that may be cross-linked to polymers. This may be done in two dimensions and it opens the possibility to arrange for example, in the same layer, zones with different conversion dyes. In this way, patterns (for example varying color pixels) may be generated using known printing methods such as for example ink jet, offset printing or serigraphy.

Third Embodiment of the Conversion Layer

Another alternative of preparation of such conversion layers is the use of oil-in-water emulsions using a suitable, film-forming polymer binder that may be cross-linked. The conversion dye is dissolved or dispersed in the oil phase. Thereby, also conversion dyes may be used that cannot be dissolved or dispersed in an aqueous solution. The preparation of such emulsions and of layers derived from these emulsions is well known in the photographic industry for the preparation of colour films, as described for example in the book by P. Glafkidès, "Chimie et Physique photographiques", Volume 2, Fifth edition, Editions de l'usine nouvelle, Paris (1987), ISBN2-281-32025-1 and in other standard books on photography.

Fourth Embodiment of the Conversion Layer

A further another alternative of preparation of such conversion layers is the use of water-dispersible, thermoplastic, dye-doped polymer particles together with a binder. The binder may be one of the water-soluble polymers as described above, which may be hardened. Such a conversion layer may subsequently be hot embossed in order to seal the particles. The polymer film is generated, if necessary, in a supplementary step, after applying the layer, by a heat treatment under pressure. This subsequent heat treatment under pressure is, for example, not necessary in the case where the layer attains or exceeds the glass transition temperature of the thermoplastic polymer for a certain time during the drying step.

A subsequent heat treatment under pressure may also be used in order to imprint desired structures, such as microlenses, Fresnel lenses pyramids or other geometrical shapes.

The water dispersible thermoplastic polymers are, for example, particles, latices or waxes of polyethylene, polypropylene, polytetrafluoroethylene, polyamides, polyesters, polyurethanes, acrylonitriles, polymethacrylates such as for example methylmethacrylate, polyacrylates, polystyrenes, polyvinyl chloride, polyethylene terephthalate, copolymers of ethylene and acrylic acid and paraffin waxes (such as for example Polysperse, available from Lawter Int., Kallo, Belgium). Mixtures of these compounds or polymers such as polystyrene and acrylates, copolymers of ethylene and acrylates may also be used. The particle size of the latices may be between 20 nm and 5'000 nm, preferred are sizes between 40 nm and 1'000 nm and particularly preferred are sizes between 50 nm and 500 nm. The glass transition temperature is between 30° C. and 170° C., preferably between 50° C. and 110° C., most preferably between 60° C. and 90° C.

In the case where the layer containing the latex particles does not already form a transparent film during manufacturing, the latex particles may be sealed to form a film using devices known to someone skilled in the art, under conditions as used during lamination of photographic or ink jet printing paper. For example, the laminator GBC 3500 Pro, available from GBC European Films Group, Kerkrade, Netherlands may be used. This device is particularly suitable for a heating treatment at a temperature of 120° C. at a throughput speed of about 27 cm/min.

The water dispersible thermoplastic polymers may also be built up from several shells, wherein, for example, the core and an outer shell having different capabilities of swelling or a different glass transition temperature.

The polymer particles or polymer latices may have an uncharged surface or have a positive or a negative surface charge.

The polymer particles may be mixed with water-soluble binders, for example the binders mentioned before, preferably with polyvinyl alcohol or mixtures of different polyvinyl alcohols. Preferred are polyvinyl alcohols having a viscosity of at least 26 mPasec and a degree of hydrolysis of at least 70%.

In another embodiment of the invention, polymer particles that may be cross-linked by ultraviolet radiation may be used that are dispersed in water and applied. Afterwards, the non-porous polymer layer is formed by a heating treatment under pressure and/or by irradiation with ultraviolet radiation, as described by M. M. G. Antonisse, P. H. Binda and S. Udding-Louwrier in "Application of UV-curable powder coatings on paperlike substrates", American Ink Maker 79(5), 22-26 (2001).

Conversion Layer with Incorporated Scattering Centers

In another embodiment of the invention, the conversion layers may additionally comprise compounds acting as scattering centers. For that purpose, inorganic compounds are used having a higher refraction index than the materials used for the preparation of the conversion layer in the interesting wavelength range (between 200 nm and 2'000 nm, preferably between 200 nm and 700 nm). In contrast to the microporous or mesoporous layers having a low refraction index and containing inorganic compounds, the part of inorganic compounds relative to the used polymer is kept low so that no porosity will be created. A layer is defined as being "nonporous" in the case where the ratio of the pore volume to the total volume is below 4%.

Examples of such preferred scattering centers in the conversion layer are $PbS$, $TiO_2$, $SiO_2$, $Al_2O_3$, $AlOOH$, $ZrO_2$, $ZnO$, $SnO_2$ or the mixed oxide indium tin oxide.

The size and the amount of the used particles or of the agglomerates are chosen in a way that the desired effect is attained. In a preferred embodiment of the invention, the mean particle diameter of these inorganic nanoparticles (primary particles) is preferably between 200 nm and 10'000 nm. Particularly preferred is the size range between 400 nm and 3'000 nm.

In the case where such particles are added, additives improving the compatibility of the particles with the conversion layer may optionally be added, such as surface modifying agents.

In another preferred embodiment of the invention, the scattering centers are compounds having a lower refraction index than the polymers used in the conversion layer, for example air bubbles, hollow micro-spheres or aerogel particles, particles that are available for example under the trade name Nanogel® from Cabot Corporation, Tuscola, USA.

In another preferred embodiment of the invention, the conversion dye is incorporated into a microporous and mesoporous layer additionally comprising strongly light refracting scattering centers. Scattering efficiency is increased by a maximal ratio between scattering particles and air. In this embodiment, the conversion layer also acts as extraction layer.

Microporous and Mesoporous Interlayer with Incorporated Scattering Centers

The microporous and mesoporous interlayer consists of a three-dimensional network of two interpenetrating phases, a solid one and a gaseous one. The network has structures in the sub-micrometer range. Scattering in the microporous and mesoporous interlayer may be influenced by a purposeful control of the morphology of the pore structure, for example by the addition of bigger particles, agglomerates or particles having other morphologies (for example with rod or platelet structure) of the same material, thus perturbing the homogeneous pore size distribution and acting therefore as scattering centers.

Scattering may also be generated by a purposeful incorporation of additional scattering particles having a higher refraction index. This may be done for example by the incorporation of $TiO_2$, $SiO_2$, $Al_2O_3$, $AlOOH$, $ZnO$, $ZrO_2$, $PbS$, $SnO_2$ or the mixed oxide indium tin oxide. The size and the amount of the used particles or of the agglomerates are chosen in a way that the desired effect is attained. Preferred sizes are between 200 nm and 10'000 nm, particularly preferred are sizes between 400 nm and 3'000 nm. In the case where such particles are added, additives improving the compatibility of the particles with the microporous and mesoporous layer may optionally be added, such as surface modifying agents.

Layer Preparation

The layers according to the invention are in general applied or coated onto the flexible support from aqueous solutions or dispersions containing all necessary ingredients. In many cases, wetting agents are added to those coating solutions in order to improve the coating behavior and the evenness of the layers. Although these surface-active compounds are not specifically claimed in this invention, they nevertheless form an important part of the invention.

In order to prevent brittleness of the layers containing inorganic nanoparticles and having the low refractive index, plasticizers such as for instance glycerol may be added.

The materials according to the invention have at least one multi-layer package comprising a microporous and mesoporous layer having a low refractive index and a conversion layer, or several such multi-layers, wherein the sequence of the layers, the orientation of the layers, the exact composition of the layers and their thickness depend on the use of these materials. In the case of several multi-layer packages, they may be applied one after the other or simultaneously to the flexible support.

In a first embodiment of the invention for the preparation of such a flexible material for optical applications, the microporous and mesoporous layer containing inorganic nanoparticles and a binder, and, optionally, other ingredients, is applied first to the flexible support. Aqueous, colloidal dispersions of these inorganic nanoparticles and the binder and, optionally, other ingredients, are applied at temperatures between 0° C. and 100° C., preferably between 15° C. and 60° C., to flexible supports. The coated flexible support is dried afterwards. The conversion layer is applied to the coated flexible support in a second step, by applying aqueous solutions comprising all the necessary ingredients, at temperatures between 0° C. and 100° C., preferably between 15° C. and 60° C. The coated flexible support is dried afterwards.

In another embodiment of the invention, other layer assemblies may be applied to the flexible support already coated with a layer assembly using one of the methods described above.

In a preferred embodiment of the invention, all layers are applied simultaneously to the support.

In a preferred embodiment of the invention, two multi-layers are applied to the flexible support, wherein the sequence of the layers may be as follows: flexible support, a microporous and mesoporous layer having a low refraction index, a first conversion layer, then a second conversion layer having another conversion dye, and, on top of it, a second microporous and mesoporous layer having a low refraction index.

In another embodiment of the invention, the multi-layers each containing a microporous and mesoporous layer having a low refraction index and containing inorganic nanoparticles and a conversion layer are applied simultaneously to the flexible support. Afterwards, the coated layer is dried.

Drying may be done with air, with infrared radiation, with microwave radiation, by contact drying (the drying energy is transmitted to the material by heat conduction from the heated surface of a medium only) or by a combination of these methods.

Drying is preferably done in a gas mixture, preferably air, with the condition that the temperature of the layer during drying does not exceed 100° C., preferably 60° C.

The coating solutions may be applied to the flexible support by different methods. The coating methods include all well known coating methods, as for example gravure coating, roll coating, rod coating, slit coating, extrusion coating, doctor blade coating, cascade coating, curtain coating and other common coating methods. In the case where the flexible support is fixed to a solid surface, immersion coating or spin coating may also be used.

The coating speed depends on the used coating process and may be varied within wide limits. Curtain coating at speeds between 30 m/min and 2'000 m/min, preferably between 50 m/min and 500 m/min, is the preferred coating process for the manufacture of the materials according to the invention.

All multi-layers mentioned above may comprise in one or more layers further ingredients, as for example other luminescent or light absorbing compounds.

In the following, other preferred embodiments of the invention will be discussed.

The conversion layer (3) may comprise more than one conversion dye in the same layer.

The conversion layer (3) may comprise at least two conversion dyes, enabling energy transfer.

Figure 6:
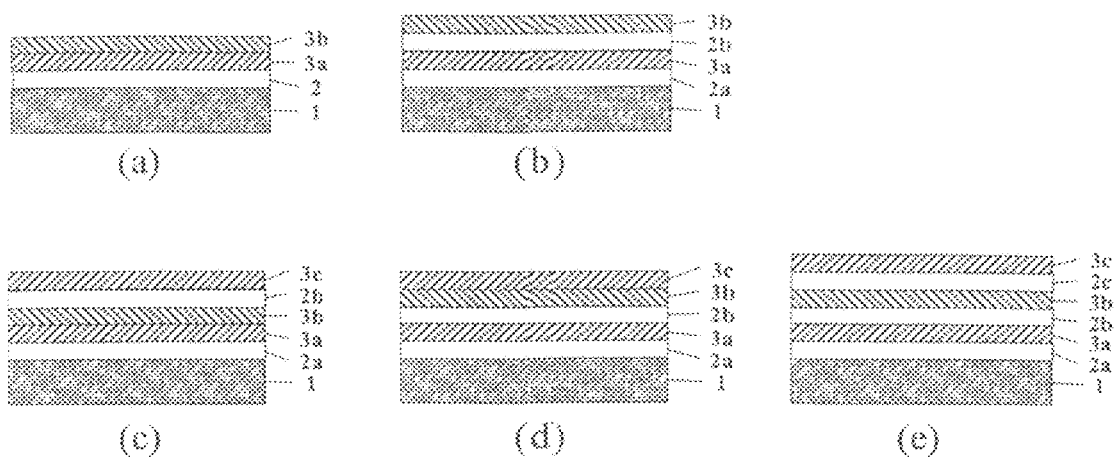
FIGS. 6a, 6b, 6c, 6d and 6e show different alternatives of conversion foils having several conversion layers.

The conversion layer (3) may consist of several layers (3a, 3b) (see FIG. 6a). All conversion layers and interlayers may be of different thickness and compositions within the limits of the described properties.

Between the different conversion layers (3a) and (3b), there may be a microporous and mesoporous interlayer (2) having a low refraction index (see FIG. 6b). All conversion layers and interlayers may be of different thickness and compositions within the limits of the described properties.

There may be, on top of the first conversion layer (3a), a second conversion layer (3b), on top of it a second interlayer (2b) and a third conversion layer (3c) (see FIG. 6c). All conversion layers and interlayers may be of different thickness and compositions within the limits of the described properties.

In another preferred embodiment of the invention, there is, on top of the first conversion layer (3a), a second interlayer (2b), on top of it a second conversion layer (3b) and, on top of it, a third conversion layer (3c) (see FIG. 6d). All conversion layers and interlayers may be of different thickness and compositions within the limits of the described properties.

On the first conversion layer (3a), there may be a second interlayer (2b), on top of it a second conversion layer (3b), on top of it a third interlayer (2c) and on top of it a third conversion layer (3c) (see FIG. 6e). All conversion layers and interlayers may be of different thickness and compositions within the limits of the described properties.

All multi-layers may comprise in one or more layers further ingredients, as for example other luminescent or light absorbing compounds.

Furthermore, there may be applied an antireflection layer to the other side of the support.

Microporous and Mesoporous Antireflection Layer

A microporous and mesoporous layer may be applied as an antireflection layer to the support, having a similar composition as the microporous and mesoporous interlayer described above. The optimal composition of such an antireflection layer in matters of reflection index and layer thickness is described for example in patent application EP 1'022'587.

Microporous and Mesoporous Light Extraction Layers

A supplementary layer may be applied to the topmost conversion layer which favors light extraction. As light extraction layer, a microporous and mesoporous layer having a similar composition as the microporous and mesoporous interlayer described above may be used. The refraction index of the layers may be adjusted by the choice of the inorganic particles. It is also feasible to adjust the refraction index by changing the porosity of the layer. This may be achieved by varying of the amount of the used binder. The refraction index is situated between the mean refraction index of the conversion layer and the refraction index of the surroundings. A refraction index situated between 1.1 and 1.5 at a wavelength of 550 nm is preferred. It is also feasible to use a sequence of microporous and mesoporous layers having a gradient of refraction indices, guaranteeing a gradual transition from the refraction index of the conversion layer to the refraction index of the surroundings. The operating mode of similar light extraction layers is described for example in patent applications US 2007/0'241'355 or US 2006/0'278'883.

Conversion Layers Having a Surface Structure

A structure may be, optionally, applied to the topmost conversion layer, which may influence light extraction and light distribution. Such a structure may be applied using ink jet printing, photolithography, offset printing, laser marking or by hot embossing. In the case where the conversion layer partially consists of thermoplastic polymers, such structures may be embossed directly into the topmost conversion layer. Different alternatives of such structures and their properties are described in the following patent applications WO 2007/011,154 or WO 01/41,225.

It is also feasible to prepare a suitable layer separately and to laminate it to the conversion layer.

One or more supplementary layers with other functionalities (for example luminescence layers, electrically conductive layers, reflecting layers, protective layers, layers for mechanical stabilization or stripping layers) may, optionally, be applied between the support and the layers or on top of the layers.

There may be present a stripping layer on the support, allowing the transfer of the multi-layers on the support onto another support: foil, glass . . . . In this case, it may be reasonable to arrange the layers in the reverse order, so that they will be in the sequence according to the invention on the new support.

A layer allowing a later lamination or bonding of the conversion foil may be applied to the backside of the support.

In this way, the side of the conversion foil with the conversion layer may be laminated to another material.

The present invention will be illustrated in more detail by the following examples without limiting the scope of the invention in any way.

EXAMPLES

In the following, seven examples of composition and preparation of layers of the optical elements according to the invention will be described in detail. Measurement results will be presented in FIGS. 7 to 19 (wherein the notations W, T, R and A are the same as defined in the description of FIG. 1) and discussed further on in the results section.

Example 1

TiO$_2$ Particles as Scattering Centres in the Conversion Layer

Conversion layers having the composition as listed in Table 1, incorporating the dye PDP (perylene dicarboxylic acid disobutyl ester) and TiO$_2$ scattering centers in the conversion layer were prepared in the following way:

First, oil emulsions containing the necessary amount of PDB (available from ABCR GmbH & Co. KG, Karlsruhe, Germany) were prepared. The conversion dye was dissolved in a mixture of tricresylphosphate (TKP) oil (available under the trade name Disflammol from Lanxess Germany GmbH, Leverkusen, Germany) and ethyl acetate and added at a temperature of 60° C. under vigorous stirring to an aqueous solution of gelatin (gelatin Gelita, available from Gelita AG, Eberbach, Germany) containing sodium diisopropyl naphthalene sulphonate (available as Naxan DIL from Nease Corporation, Harisson, USA). The ethyl acetate was distilled off under reduced pressure. The oil droplets were reduced to a typical size of 1 µm by an ultrasound treatment.

In parallel, the different dispersions of TiO$_2$ were prepared. Kronos AV (available from Kronos International, Inc., Leverkusen, Germany) was dispersed at very high shear rates in demineralised water.

For the preparation of the coating solutions, the oil emulsion and the dispersion of TiO$_2$ were mixed and diluted with demineralized water. The coating solutions having the composition (in the dried state) listed in Table 1 were applied to a subbed transparent polyester support Cronar® 742 (available from DuPont Tejin Films, Luxemburg) with the aid of suitable Meyer bar coater and dried at a temperature of 40° C.

TABLE 1

| Example | Gelatine (g/m$^2$) | TKP (g/m$^2$) | Conversion dye PDB (g/m$^2$) | TiO$_2$ (g/m$^2$) |
|---|---|---|---|---|
| 1-A | 8.9 | 5.0 | 0 | 0.0 |
| 1-B | 8.9 | 5.0 | 0 | 0.1 |
| 1-C | 8.9 | 5.0 | 0 | 0.3 |
| 1-D | 8.9 | 5.0 | 0 | 1.0 |
| 1-E | 8.9 | 5.0 | 0.05 | 0.0 |
| 1-F | 8.9 | 5.0 | 0.05 | 0.1 |
| 1-G | 8.9 | 5.0 | 0.05 | 0.3 |
| 1-H | 8.9 | 5.0 | 0.05 | 1.0 |

Example 2

SiO$_2$ Particles as Scattering Centers in the Conversion Layer

Conversion layers having the composition (in the dried state) as listed in Table 2, incorporating the dye PDP and SiO$_2$ scattering centers in the conversion layer were prepared as in example 1. Sylord C803, available from Grace Davison GmbH & Co. KG, Reinach, Switzerland, was used for the preparation of the dispersion of SiO$_2$.

TABLE 2

| Example | Gelatine (g/m$^2$) | TKP (g/m$^2$) | Conversion dye PDB (g/m$^2$) | SiO$_2$ (g/m$^2$) |
|---|---|---|---|---|
| 2-A | 8.9 | 5.0 | 0 | 0.0 |
| 2-B | 8.9 | 5.0 | 0 | 1.0 |
| 2-C | 8.9 | 5.0 | 0 | 2.5 |
| 2-D | 8.9 | 5.0 | 0 | 5.0 |
| 2-E | 8.9 | 5.0 | 0.05 | 0.0 |
| 2-F | 8.9 | 5.0 | 0.05 | 1.0 |
| 2-G | 8.9 | 5.0 | 0.05 | 2.5 |
| 2-H | 8.9 | 5.0 | 0.05 | 5.0 |

Example 3

Microporous and Mesoporous Layer as Optical Interlayer Between the Conversion Layer and the Transparent Support A microporous and mesoporous layer having a low refraction index and the composition (in the dried state) as listed in Table 3-1 was applied to a subbed transparent polyester support Cronar® 742.

TABLE 3-1

| Ingredient | Quantity (g/m$^2$) | | | |
|---|---|---|---|---|
| | 3-A | 3-B | 3-C | 3-D |
| Aluminium oxide/hydroxide AP-3 | 0.0 | 7.200 | 15.000 | 28.000 |
| Lactic acid | 0.0 | 0.210 | 0.438 | 0.818 |
| Mowiol 2688 | 0.0 | 0.264 | 0.550 | 1.027 |
| Mowiol 5698 | 0.0 | 0.528 | 1.100 | 2.053 |
| Hardener | 0.0 | 0.162 | 0.338 | 0.630 |

AP-3 is available as Cataloid AP-3 from CCIC, Osaka, Japan. Mowiol 2688 and Mowiol 5698 are available from Clariant AG, Muttenz, Switzerland. The hardener is boric acid, available from Schweizerhalle Chemie AG, Basel, Switzerland.

A polymer layer having the composition (in the dried state) as listed in Table 3-2 was then applied to the layers 3-A, 3-B, 3-C and 3-D.

TABLE 3-2

| Ingredient | Quantity (g/m$^2$) |
|---|---|
| Methylhydroxypropyl cellulose (MHPC) | 4.175 |
| Coumarin 334 | 0.013 |

Methylhydroxypropyl cellulose is available as Culminal MHPC-50 from Hercules International GmbH, Schaffhausen, Switzerland. Coumarin 334 from Acros Organics is available from Fisher Scientific, Wohlen, Switzerland.

The composition of the resulting samples is listed in Table 3-3.

TABLE 3-3

| Example | Microporous and mesoporous layer (g/m$^2$) | MHPC layer (g/m$^2$) |
|---|---|---|
| 3-A | 0 | 4.188 |
| 3-B | 8.364 | 4.188 |
| 3-C | 17.426 | 4.188 |
| 3-D | 32.528 | 4.188 |

Example 4

Scattering in the Microporous and Mesoporous Layer

In example 4-A, the conversion layer (PDB: 0.05 g/m$^2$; TKP: 5 g/m$^2$; gelatin: 8.9 g/m$^2$) was coated onto a transparent polyester support Cronar® 742.

In example 4-B, the same conversion layer was coated onto a microporous and mesoporous layer (CAB-O-SIL M-5: 19 g/m$^2$; Mowiol 4088: 5 g/m$^2$) already coated on the transparent polyester support Cronar® 742.

In example 4-C, the same conversion layer was coated onto a microporous and mesoporous, strongly light scattering layer (CAB-O-SIL M-5: 10.5 g/m$^2$; Mowiol 5698: 4 g/m$^2$; Kronos AV: 2 g/m$^2$) already coated on the transparent polyester support Cronar® 742.

Mowiol 4088 and Mowiol 5698 are available from Clariant AG, Muttenz, Switzerland. CAB-O-SIL M-5 is available from Cabot GmbH, Rheinfelden, Germany.

TABLE 4

| Example | Layer sequence |
|---|---|
| 4-A | PET/conversion layer |
| 4-B | PET/microporous and mesoporous interlayer/conversion layer |
| 4-B | PET/microporous and mesoporous interlayer with incorporated TiO$_2$ scattering centres/conversion layer |

Example 5

Combination of a Microporous and Mesoporous Interlayer with Scattering Centers in the Conversion Layer The conversion layer (PDB: 0.04 g/m$^2$; TKP: 8 g/m$^2$; gelatin: 8 g/m$^2$) having different levels of scattering centers according to Table 5 were coated either directly coated on the transparent polyester support Cronar® 742 or, otherwise, onto a microporous and mesoporous layer (CAB-O-SIL-5: 2 g/m$^2$; Mowiol 4088: 0.6 g/m$^2$) already coated on the same support. A thin protection layer (gelatin: 2 q/m$^2$) was finally coated onto all the layers.

TABLE 5

| Example | Microporous and mesoporous layer (g/m$^2$) | Amount of TiO$_2$ in the conversion layer (g/m$^2$) |
|---|---|---|
| 5-A | 0 | 0.0 |
| 5-B | 0 | 0.2 |
| 5-C | 0 | 0.4 |
| 5-D | 2.6 | 0.0 |
| 5-E | 2.6 | 0.2 |
| 5-F | 2.6 | 0.4 |

Example 6

Light Extraction by Surface Roughness

A polymer layer having a thickness of 5 μm and the composition (in the dried state) as listed in Table 6 was applied to a subbed transparent polyester support Cronar® 742.

TABLE 6-1

| Ingredient | Quantity (g/m$^2$) |
|---|---|
| Methylhydroxypropyl cellulose (MHPC) | 3.71 |
| Pigment | 0.51 |

The pigment consisted of zeolite LTL crystals (length 70 nm), wherein 15% of the accessible internal pore volume was loaded with the dye PDB. A method of charging of zeolite crystals with neutral dyes is described by M. Pauchard, A. Devaux and G. Calzaferri in "Dye-Loaded Zeolite L Sandwiches as Artificial Antenna Systems for Light Transport", Chemistry—A European Journal 6, 3456-3470 (2000).

Zeolite LTL is available from NanoScape AG, Planegg-Martinried, Germany.

In example 6-B, a polymer layer consisting of 4.02 g/m$^2$ of MHPC was applied to this layer.

The composition of the resulting samples is listed in Table 6-2.

TABLE 6-2

| Example | MHPC with zeolite pigment (g/m²) | MHPC overlayer (g/m²) |
|---|---|---|
| 6-A | 4.22 | 0 |
| 6-D | 4.22 | 4.02 |

Example 7

Combination of a Microporous and Mesoporous Interlayer with Scattering Centers in the Conversion Layer Conversion layers having the composition (in the dried state) as listed in Table 7 were applied directly to a subbed transparent polyester support Cronar® 742.

TABLE 7

| Example | Mowiol 5698 (g/m²) | Coumarin 334 (g/m²) | TiO₂ (g/m²) |
|---|---|---|---|
| 7-A | 0 | 0.014 | 0.0 |
| 7-B | 2.6 | 0.014 | 0.1 |

Test Methods

FIG. 3 shows the measurement set-up, which was used to measure total transmission and total reflection of the conversion foils. The distinction between diffuse and directed parts can be made if it is prevented that the directed parts impact to the detector.

With the aid of reference samples having the same composition, but without conversion dye, rafting and absorption may be calculated. The assumption is made that absorption in the reference sample is equal to zero and that rafting is the same in the sample and the reference sample.

FIG. 4 shows the measurement set-up, which was used to measure the fluorescence properties.

A blue emitting LED or laser light of wavelength 450 nm were used as excitation light source.

Results

The purposeful incorporation of scattering centers is a possibility to influence the spatial distribution of radiated light and to increase the conversion efficiency. Scattering reduces the amount of directed transmission and increases the parts of diffuse transmission and reflection. FIG. 7 shows the distribution of light (of a blue LED light source with wavelength 450 nm) of a sample without (Example 7-A) and with introduced diffusion (Example 7-B) in the conversion layer.

FIG. 7 shows that the introduction of diffusion reduces total transmission by only about 5% and increases total reflection by only about 5%. The part of diffuse transmission, however, is increased by about 19% in comparison to directed transmission. Directed reflection is nearly unchanged, because it is dominated by reflection at the surface of the support. The purposeful incorporation of scattering centers allows therefore to preferentially and purposefully increase the part of diffuse transmission.

Scattering of the light also leads to an increase of the length of the optical path in the conversion foil, which may again increase absorption.

FIGS. 8 and 9 clearly show how this balance may be influenced by the purposeful incorporation of scattering centers.

FIGS. 8 and 9 show the behavior of total transmission ($T_g(\lambda)+T_d(\lambda)$), total reflection ($R_g(\lambda)+R_d(\lambda)$), absorption $A(\lambda)$ and rafting $W(\lambda)$ with TiO₂ scattering centers (Examples 1-A to 1-D), respectively SiO₂ scattering centers (Examples 2-A to 2-D) of a reference foil that does not contain a conversion dye (therefore absorption is equal to zero) at a wavelength of 450 nm. It is clearly seen how transmission is reduced with increasing concentration of scattering centers and reflection is increased. Rafting also slightly increases, because the scattering centers favor the coupling in of excitation light into the wave-guide. The effect of TiO₂ is more pronounced, because the difference of refraction indices between the particles and the surrounding film is bigger than for SiO₂.

FIGS. 10 and 11 show similar samples containing now a conversion dye which may absorb the impacting blue light (Examples 1-E to 1-H, respectively Examples 2-E to 2-H). The amount of conversion dye is the same in all samples.

It may clearly be seen that absorption increases at the expense of transmission and reflection. It may also be seen that absorption may be increased, at the same amount of conversion dye, by the incorporation of scattering centers. This effect, however, relatively quickly goes into saturation. Absorption may be significantly more increased in the case of TiO₂ scattering centers in comparison to SiO₂.

FIG. 12 shows fluorescence emission of light emitted by the conversion dye in the forward direction ($E_v$) of the same two sample series (Examples 1-E to 1-H, respectively Examples 2-E to 2-H).

It can be seen that the purposeful incorporation of scattering centers leads in both cases to an increase of the intensity of radiated converted fluorescence. This can partially be explained by increased absorption. The effect, however, relatively quickly goes into saturation, as was the case before with absorption. The intensity of radiated fluorescence may be significantly more increased in the case of TiO₂ scattering centers in comparison to SiO₂.

FIG. 13 shows the behavior of fluorescence extraction efficiency of the same two sample series, that is the intensity of fluorescence radiated in the forward direction divided by the amount of absorbed radiation.

It can clearly be seen that fluorescence extraction efficiency is increased with increased scattering and then goes into saturation. The difference of maximally attained fluorescence extraction efficiency of the two series is not very big.

These examples show that the purposeful incorporation of scattering centers may increase up to a certain amount the conversion efficiency, that is to say absorption and radiation of light in the forward direction.

The incorporation of particles may give rise to two kinds of scattering centers. On one hand, the light may directly be scattered by the particles in the layer if there is a difference of refraction index between the particles and the surrounding layer material and if the particles are bigger than the wavelength of the light that has to be scattered. On the other hand, the incorporation of particles may increase the surface roughness, leading to an increase of light scattering at the surface.

FIG. 14 shows the effect of surface roughness of a sample on fluorescence radiated in the forward direction (Examples 6-A and 6-B). The sample was chosen in such a way that the particles and the surrounding layer material have the same refraction index, preventing direct scattering by the particles. It is therefore only increased surface roughness that makes a contribution to the increase of fluorescence radiated in the forward direction. In a reference sample, the surface was flattened by a polymer over-layer. The intensity of fluorescence radiated in the forward direction was halved in this sample.

FIG. 15 shows the roughness profiles of the two samples, measured by atomic force microscopy. This shows that that a rough surface of the conversion layer can increase fluorescence extraction considerably.

If the conversion layer is made sufficiently thin, so that it is no longer a good wave-guide and optically isolates the conversion layer from the transparent support, and if an interlayer with low refraction index is present between the conversion layer and the support, rafting may be weakened and fluorescence radiated in the perpendicular direction to the foil may be considerably increased.

FIG. 16 shows the sample series (Examples 3-A to 3-D) illustrating this behavior.

In the case, the interlayer is a microporous and mesoporous layer having a low refraction index. Fluorescence radiation in the forward direction may be increased in the series (Examples 3-A to 3-D) by a factor >2. This effect, however, goes into saturation. The size of the effect depends on the layer thickness and the refraction index of the interlayer. The lower the refraction index and the thicker the layer, the higher the effect. Nevertheless, there will be saturation sometimes.

Another alternative for influencing the spatial distribution of the radiated light is the incorporation of scattering centers into the interlayer having the low refraction index that isolates the conversion layer from the support.

FIG. 17 shows the behavior of such a sample series with such an interlayer (Examples 4-A to 4-D).

FIG. 17 confirms that an interlayer having a low refraction index (Example 4-B) may increase fluorescence radiated in the forward direction and fluorescence extraction efficiency in comparison to a sample without such a layer (Example 4-) (see also results in FIG. 16). The absorption remains unchanged. The incorporation of TiO$_2$ scattering centers into the interlayer (Example 4-C) leads to a slight increase of fluorescence of the conversion dye radiated in the forward direction. Absorption in the sample decreases by about 50%, because external scattering in front of the conversion layer also leads to an increased reflection of excitation light. The increased reflection, however, is also responsible that fluorescence extraction efficiency is nearly doubled, because scattering in the interlayer redirects part of the light radiated in the backward direction into the forward direction.

FIG. 18 shows the measured fluorescence spectra of samples (Examples 4-A to 4-C).

FIG. 18 shows the incorporation of scattering centres into the interlayer may selectively reduce the part of the excitation light in comparison to the converted light, without reducing fluorescence intensity of converted light. This would not be feasible in the case where the intensity of the excitation light would be reduced by the introduction of a selective absorption filter in front of the conversion layer. In this case, converted fluorescence would be reduced to the same extent. However, if the intensity of excitation light is reduced by the incorporation of scattering centers (Example 4-C), fluorescence extraction efficiency would be increased at the same time and could thus compensate the losses.

A further alternative of influencing the spatial distribution of radiated light and increasing conversion efficiency is the optical isolation of the conversion layer from the support and the purposeful incorporation of scattering centers into the conversion layer.

FIG. 19 shows that fluorescence radiated in the forward direction may be improved in the material according to the invention by a combination of the two measures in comparison with the situation where only scattering or an interlayer is used. The simultaneous introduction of scattering and the use of a microporous and mesoporous interlayer gives the possibility to optimize the properties of the conversion foil and, at the same time, increase total conversion efficiency. The combination of the two measures allows therefore to obtain a high intensity of fluorescence radiated in the forward direction even in cases where it is a disadvantage or difficult to incorporate high concentrations of scattering centers directly into the conversion layer.

Finally, variations from the examples given herein are possible in view of the above disclosure. Therefore, although the invention has been described with reference to certain preferred embodiments, it will be appreciated that other binders may be devised, which are nevertheless within the scope and spirit of the invention as defined in the claims appended hereto.

The foregoing description of various and preferred embodiments of the present invention has been provided for purposes of illustration only, and it is understood that numerous modifications, variations and alterations may be made without departing from the scope and spirit of the invention as set forth in the following claims.

The invention claimed is:

1. An optical element consisting of a transparent support (1) and at least one transparent optical conversion layer (3) comprising conversion dyes which absorb light of one wavelength and radiation light of higher wavelength, wherein said optical element comprises at least on microporous and mesoporous interlayer (2) situated between the support (1) and the optical conversion layer (3) wherein the conversion layer and the interlayer both contain a binder and that scattering centers (4) are present either in the optical conversion layer (3) and/or the interlayer (2).

2. The optical element according to claim 1, wherein the support (1), the interlayer (2) and the optical conversion layer (3) are flexible and that the optical element is in the form of a flexible foil.

3. The optical element according to claim 1, wherein there is, on the support (1), a first interlayer (2*a*), a first conversion layer (3*a*) on top of it, a second interlayer (2*b*) on top of it and a second conversion layer (3*b*) on top of it.

4. The optical element according to claim 3, wherein on top of the second conversion layer (3*b*) there is a third interlayer (2*c*) and a third conversion layer (3*c*) on top of it.

5. The optical element according to claim 1, wherein there are, in direct contact, two conversion layers (3*a*, 3*b*) on top of the interlayer (2).

6. Optical element according to claim 1, wherein there is first and a second interlayer (2*a*, 2*b*), separated by two conversion layers (3*a*, 3*b*) in direct contact.

7. The optical element according to claim 3, wherein there is, on the second conversion layer (3*b*), a third conversion layer (3*c*) without an intermediate interlayer.

8. The optical element according to claim 1, wherein, as far as the scattering centers are incorporated into the conversion layer or the conversion layers, the scattering centers are particles selected from at least one member of the group consisting of PbS, TiO$_2$, SiO$_2$, Al$_2$O$_3$, AlOOH, ZrO$_2$, ZnO, SnO$_2$, a mixed indium tin oxide, hollow micro-spheres or aerosol particles, each having a mean particle size situated between 200 nm and 10'000 nm.

9. The optical element according to claim 1, wherein, as far as the scattering centers are incorporated into the interlayer or the interlayers, the scattering centers consist of particles of the same material as the interlayers, but leading to a different pore size distribution, or of particles selected from at least one member of the group consisting of PbS, $TiO_2$, $SiO_2$, $Al_2O_3$, AlOOH, $ZrO_2$, ZnO, $SnO_2$, a mixed indium tin oxide, hollow micro-spheres or aerosol particles, each having a mean particle size situated between 200 nm and 10'000 nm.

10. The optical element according to claim 1, wherein said optical element comprises further layers, including an antireflection layer situated on the support, an adhesive layer, a release layer on the adhesive layer or a stripping layer.

11. The optical element according to claim 1, wherein the conversion dyes are selected from the group consisting of organic fluorescent dyes, luminescent organometallic complexes, fluorescent dendrirners, organic dye complexes with cyclodextrines and inorganic phosphors.

12. The optical element according to claim 1, wherein the uppermost conversion layer is provided with optical elements including Fresnel lenses, microlenses, polymer spheres, or another layer, further improving light extraction and the distribution of radiated light.

13. The optical element according to claim 1, wherein one or more layers comprise further ingredients including luminescent or light absorbing compounds.

* * * * *